(12) United States Patent
Ueda et al.

(10) Patent No.: US 10,014,903 B2
(45) Date of Patent: Jul. 3, 2018

(54) NON-RECIPROCAL TRANSMISSION APPARATUS WITH DIFFERENT BACKWARD AND FORWARD PROPAGATION CONSTANTS, PROVIDED FOR CIRCULARLY POLARIZED WAVE ANTENNA APPARATUS

(71) Applicant: JAPAN SCIENCE AND TECHNOLOGY AGENCY, Saitama (JP)

(72) Inventors: Tetsuya Ueda, Osaka (JP); Andrey Porokhnyuk, Kyoto (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 8 days.

(21) Appl. No.: 15/121,530

(22) PCT Filed: Feb. 25, 2015

(86) PCT No.: PCT/JP2015/055434
§ 371 (c)(1),
(2) Date: Aug. 25, 2016

(87) PCT Pub. No.: WO2015/129757
PCT Pub. Date: Sep. 3, 2015

(65) Prior Publication Data
US 2016/0373160 A1    Dec. 22, 2016

(30) Foreign Application Priority Data
Feb. 27, 2014    (JP) .................. 2014-036943

(51) Int. Cl.
*H04B 1/38*    (2015.01)
*H04L 5/16*    (2006.01)
(Continued)

(52) U.S. Cl.
CPC ............. *H04B 1/525* (2013.01); *H01Q 21/20* (2013.01); *H01Q 21/24* (2013.01); *H04B 1/582* (2013.01); *H04B 1/586* (2013.01)

(58) Field of Classification Search
CPC ........... H01P 1/32; H01P 1/19; H01Q 13/206; H01Q 21/20; H01Q 21/24; H04B 1/525; H04B 1/582; H04B 1/586
See application file for complete search history.

(56) References Cited

U.S. PATENT DOCUMENTS

| | | | | |
|---|---|---|---|---|
| 8,294,538 B2 * | 10/2012 | Ueda | ...................... | H01P 1/203 333/236 |
| 9,054,406 B2 * | 6/2015 | Ueda | ........................ | H01P 1/32 |

(Continued)

FOREIGN PATENT DOCUMENTS

| | | |
|---|---|---|
| JP | 2007-325118 | 12/2007 |
| JP | 2013-89992 | 5/2013 |

(Continued)

OTHER PUBLICATIONS

English translation of the International Preliminary Report on Patentability dated Sep. 9, 2016 in International (PCT) Application No. PCT/JP2015/055434.

(Continued)

*Primary Examiner* — Shuwang Liu
*Assistant Examiner* — Sung Ahn
(74) *Attorney, Agent, or Firm* — Wenderoth, Lind & Ponack, L.L.P.

(57) ABSTRACT

In a circularly polarized wave antenna apparatus including a non-reciprocal transmission line apparatus having forward and backward propagation constants different from each other, the non-reciprocal transmission line apparatus includes a transmission line part for a microwave, a series branch circuit equivalently including a capacitive element, (Continued)

and a shunt branch circuit branched from the transmission line part and equivalently includes an inductive element. The non-reciprocal transmission line apparatus is formed in a nonlinear shape and magnetized in a magnetization direction different from a propagation direction of the microwave. The non-reciprocal transmission line apparatus includes first and second reflectors provided at both ends of the non-reciprocal transmission line apparatus, respectively, and reflecting a signal; and satisfies that a phase difference between each pair of line parts located at positions opposed to each other across a substantially central part of the non-reciprocal transmission line apparatus is substantially 180 degrees.

6 Claims, 34 Drawing Sheets

(51) Int. Cl.
| | | |
|---|---|---|
| *H04B 1/525* | (2015.01) | |
| *H01Q 21/20* | (2006.01) | |
| *H01Q 21/24* | (2006.01) | |
| *H04B 1/58* | (2006.01) | |

(56) References Cited

U.S. PATENT DOCUMENTS

| | | | | |
|---|---|---|---|---|
| 2010/0060388 | A1* | 3/2010 | Ueda | H01P 1/203 333/236 |
| 2013/0130217 | A1* | 5/2013 | Dohring | G09B 5/06 434/350 |
| 2013/0321093 | A1 | 12/2013 | Ueda et al. | |
| 2013/0321098 | A1* | 12/2013 | Fukuda | H01P 1/26 333/124 |

FOREIGN PATENT DOCUMENTS

| | | |
|---|---|---|
| WO | 2008/111460 | 9/2008 |
| WO | 2011/024575 | 3/2011 |
| WO | 2012/115245 | 8/2012 |

OTHER PUBLICATIONS

International Search Report dated May 12, 2015 in International Application No. PCT/JP2015/055434 (with English translation).

\* cited by examiner

Fig.37

| REFLECTOR LENGTH (mm) | ZEROTH-ORDER RESONANCE FREQUENCY(GHz) | GAIN (dBi) | AXIAL RATIO | RADIATION EFFICIENCY |
|---|---|---|---|---|
| 0.5 | 5.21 | 2.763 | 1.788 | 0.701 |
| 1.5 | 5.20 | 2.788 | 1.686 | 0.710 |
| 2.5 | 5.18 | 2.793 | 1.621 | 0.717 |
| 3.5 | 5.16 | 2.542 | 1.547 | 0.721 |
| 4.5 | 5.14 | 2.287 | 1.541 | 0.723 |
| 5.5 | 5.11 | 1.928 | 1.593 | 0.721 |
| 6.5 | 5.08 | 1.532 | 1.793 | 0.713 |
| 7.5 | 5.06 | 0.896 | 2.132 | 0.702 |

Fig.38

| REFLECTOR LENGTH (mm) | ZEROTH-ORDER RESONANCE FREQUENCY(GHz) | GAIN (dBi) | AXIAL RATIO | RADIATION EFFICIENCY |
|---|---|---|---|---|
| 0.5 | 6.23 | 3.958 | 2.533 | 0.710 |
| 1.5 | 6.2 | 3.475 | 2.195 | 0.715 |
| 2.5 | 6.18 | 3.445 | 1.966 | 0.730 |
| 3.5 | 6.16 | 3.016 | 1.862 | 0.732 |
| 4.5 | 6.13 | 3.213 | 1.715 | 0.746 |
| 5.5 | 6.09 | 3.005 | 1.650 | 0.754 |
| 6.5 | 6.05 | 2.690 | 1.562 | 0.760 |
| 7.5 | 6.04 | 2.901 | 1.398 | 0.772 |
| 8.5 | 6.02 | 2.546 | 1.297 | 0.774 |
| 9.5 | 5.96 | 2.535 | 1.227 | 0.766 |
| 10.5 | 5.94 | 2.396 | 1.247 | 0.764 |
| 11.5 | 5.88 | 2.293 | 1.332 | 0.759 |
| 12.5 | 5.82 | 2.228 | 1.213 | 0.743 |
| 13.5 | 5.75 | 1.827 | 1.112 | 0.716 |
| 14.5 | 5.70 | 1.703 | 1.267 | 0.703 |

NON-RECIPROCAL TRANSMISSION APPARATUS WITH DIFFERENT BACKWARD AND FORWARD PROPAGATION CONSTANTS, PROVIDED FOR CIRCULARLY POLARIZED WAVE ANTENNA APPARATUS

TECHNICAL FIELD

The present invention relates to a non-reciprocal transmission line apparatus with different backward and forward propagation constants, and relates to a circularly polarized wave antenna apparatus provided with such a non-reciprocal transmission line apparatus.

BACKGROUND ART

A composite right/left-handed transmission line (hereinafter, referred to as a CRLH transmission line) is known as one of metamaterials. The CRLH transmission line is configured by substantially periodically inserting capacitive elements in a series branch of the line and substantially periodically inserting inductive elements in shunt branches of the line at intervals sufficiently smaller than a wavelength so as to have negative effective permeability and a negative effective dielectric constant in a predetermined frequency band. Recently, a non-reciprocal phase-shift CRLH transmission line obtained by adding a non-reciprocal transmission function to the CRLH transmission line has been proposed (For example, see Patent Documents 1 to 3). The non-reciprocal phase-shift CRLH transmission line can show a positive refractive index when electromagnetic waves having an identical frequency propagate in the forward direction and can show a negative refractive index when the electromagnetic waves propagate in the backward direction.

The size of a transmission line resonator can be freely changed without changing the resonance frequency by configuring the resonator using the non-reciprocal phase-shift CRLH transmission line. Further, the electromagnetic field distribution on the resonator is similar to the electromagnetic field distribution of a travelling wave resonator. Therefore, it is possible to configure a pseudo-travelling wave resonator in which the amplitude of the electromagnetic field is uniform and the phase of the electromagnetic field linearly changes at a constant gradient along the line by using the transmission line resonator using the non-reciprocal phase-shift CRLH transmission line. At that time, the phase gradient of the electromagnetic field distribution on the resonator is determined depending on non-reciprocal phase-shift characteristic of the transmission line configuring the resonator. Hereinafter, a transmission line apparatus using the non-reciprocal phase-shift CRLH transmission line is referred to as anon-reciprocal transmission line apparatus.

For the last dozen years, metamaterials have been a very interesting and important theme in the field of application to an antenna. So far, a non-reciprocal CRLH metamaterial has been proposed for the purpose of application to a directional leaky wave antenna using the CRLH transmission line. In addition, recently, an antenna based on a pseudo-travelling wave resonator greatly advanced from a zeroth-order resonator (for example, see Patent Document 1) has been proposed, and the gain and directional pattern of the antenna based on the pseudo-travelling wave resonator have increased compared to those of a conventional leaky wave antenna although the size of the antenna based on the pseudo-travelling wave resonator is more compact.

Many of the non-reciprocal transmission line apparatuses having been proposed so far adopt a structure where a vertically magnetized ferrite rod is embedded under a strip line at the center of a composite right/left-handed transmission line apparatus constituted of a conventional microstrip line. At that time, the direction of a radiation beam from an antenna apparatus provided with a pseudo-travelling wave resonator constituted of a non-reciprocal transmission line apparatus is determined depending on the phase gradient of the electromagnetic field distribution on the resonator. In addition, in a case where ferrite is soft magnetic material, the non-reciprocal phase-shift characteristic of the line changes by changing the magnitude or the direction of the externally applied magnetic field, and as a result, beam scanning can be performed.

PRIOR ART DOCUMENTS

Patent Documents

[Patent Document 1] WO 2008/111460 A
[Patent Document 2] WO 2011/024575 A
[Patent Document 3] WO 2012/115245 A

SUMMARY OF THE INVENTION

Problem to be Solved by the Invention

However, the antenna apparatus provided with a pseudo-travelling wave resonator according to the above-described prior art can radiate a linearly polarized wave but cannot radiate a circularly polarized electromagnetic wave.

An object of the present invention is to solve the aforementioned problem, and to provide a non-reciprocal transmission line apparatus for a circularly polarized wave antenna apparatus capable of radiating a circularly polarized electromagnetic wave, and a circularly polarized wave antenna apparatus using the non-reciprocal transmission line apparatus.

Means for Dissolving the Problems

According to the first aspect of the present invention, there is provided a non-reciprocal transmission line apparatus having forward and backward propagation constants different from each other. The non-reciprocal transmission line apparatus includes a cascade connection of at least one unit cell between first and second ports, each of the at least one unit cell includes a transmission line part for a microwave, a series branch circuit equivalently including a capacitive element, and a shunt branch circuit branched from the transmission line part and equivalently includes an inductive element. Each of the at least one unit cell is disposed in a nonlinear shape, and each of the at least one unit cell has a transmission line part having spontaneous magnetization or magnetized by an external magnetic field so as to have gyrotrophy by being magnetized in a magnetization direction different from a propagation direction of the microwave. The non-reciprocal transmission line apparatus is configured such that dispersion curves of a right-handed mode and a left-handed mode intersect each other, the right-handed mode and the left-handed mode being in an opposite directional relation to each other in a direction of transmitted power transmitted along the non-reciprocal transmission line apparatus, and the microwave propagates utilizing as an operating frequency a frequency band within a band gap occurring as a result of coupling, or a frequency around a frequency at an intersection of the two dispersion curves where no band gap appears. The non-reciprocal transmission line apparatus includes first and second reflectors connected to both ends of the non-reciprocal transmission line apparatus, respectively, and the first and second reflectors reflect an input signal.

In the above-mentioned non-reciprocal transmission line apparatus, the non-reciprocal transmission line apparatus configures a pseudo-travelling wave resonator, and the pseudo-travelling wave resonator includes first and second line parts. The first line part causes a current to flow in a predetermined first direction and radiating an electromagnetic wave polarized in the first direction. The second line part causes a current to flow in a second direction, which is a vertical direction substantially orthogonal to the current flowing through the first line part, and radiating an electromagnetic wave which is polarized in the second direction, and moreover, a phase of which is advanced or delayed by 90 degrees from a phase of the electromagnetic wave of the first line part.

In addition, in the above-mentioned non-reciprocal transmission line apparatus, each of the unit cells is disposed in a single-turn ring shape having a circular, elliptical, square or rectangular shape, a spiral shape with a plurality of turns, or an L-shape.

According to the second aspect of the present invention, there is provided a circularly polarized wave antenna apparatus including the non-reciprocal transmission line apparatus, and a feed line connected to the first reflector. The circularly polarized wave antenna apparatus radiates an electromagnetic wave of right-hand circular polarization or left-hand circular polarization depending on a direction of a phase gradient due to non-reciprocity of the non-reciprocal transmission line apparatus.

In the above-mentioned circularly polarized wave antenna apparatus, the circularly polarized wave antenna apparatus radiates an electromagnetic wave of right-hand circular polarization or left-hand circular polarization by switching over the magnetization direction to opposite directions.

In addition, in the above-mentioned circularly polarized wave antenna apparatus, a radiation beam is radiated by adjusting a phase gradient of each pair of line parts located at positions opposed to each other across a substantially central part of the non-reciprocal transmission line apparatus from among a plurality of line parts each formed of the unit cell such that a phase difference between the pair of line parts is substantially 180 degrees.

Further, in the above-mentioned circularly polarized wave antenna apparatus, a radiation beam is radiated by adjusting phase gradients of each pair of line parts located at positions adjacent to each other on an identical side with respect to a substantially central part of the non-reciprocal transmission line apparatus from among a plurality of line parts each formed of the unit cell such that a phase difference between the pair of line parts is substantially 0 degrees.

Still further, in the above-mentioned circularly polarized wave antenna apparatus, the phase gradient is adjusted by changing at least one of a number of unit cells, magnitude of the magnetization, and an electrical length of the shunt branch circuit.

Still further, in the above-mentioned circularly polarized wave antenna apparatus, the first and second reflectors satisfy one of the following setting conditions:

(1) a first setting condition where an impedance thereof is 0, or the impedance has a value equal to or smaller than a predetermined value;

(2) a second setting condition where an admittance thereof is 0, or the admittance has a value equal to or smaller than a predetermined value; and (3) a third setting condition that the first and the second reflectors have reactance elements in a complex conjugate relation.

Effect of the Invention

According to the present invention, it is possible to provide a non-reciprocal transmission line apparatus for a circularly polarized wave antenna apparatus capable of radiating a circularly polarized electromagnetic wave, and a circularly polarized wave antenna apparatus more compact in size and more lightweight than that of the prior art.

BRIEF DESCRIPTION OF THE DRAWINGS

FIG. 37 is a table showing simulation results when reflector length L_Refl changes in the circularly polarized wave antenna apparatus using the ring-shaped non-reciprocal transmission line apparatus 70F of FIG. 17A.

FIG. 38 is a table showing simulation results when reflector length L_Refl changes in the circularly polarized wave antenna apparatus using the L-shaped non-reciprocal transmission line apparatus 70I of FIG. 31.

MODE FOR CARRYING OUT THE INVENTION

Figure 1:
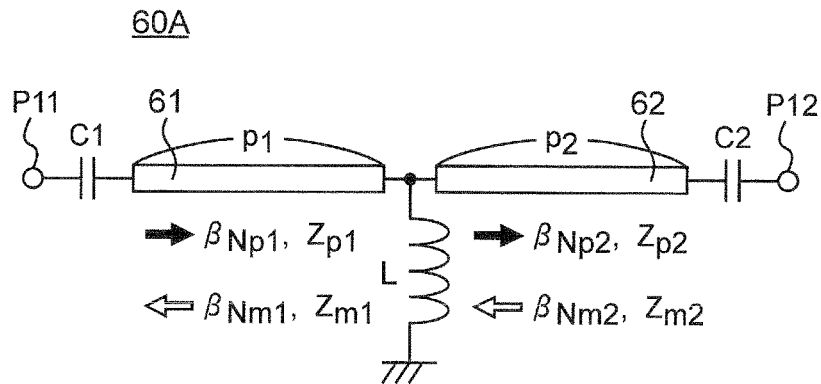
FIG. 1 is an equivalent circuit diagram of a unit cell 60A of a first exemplary transmission line in a non-reciprocal transmission line apparatus according to an embodiment of the present invention.

Embodiments of the present invention will be described below with reference to the drawings. Note that in the following embodiments, like components are denoted by the same reference characters.

1. Outline of Embodiment

A linearly polarized wave antenna usually has a relatively simple design and provides excellent antenna gain. Selection of a polarized plane can be used for simple separation of radio channels. However, a linearly polarized wave can be a disadvantage in which reception sensitivity lowers due to a change in the polarized plane, attenuation of radio waves, and the like when a high-density obstacle in terms of geography or strong radio wave interference and a radio station face each other. For example, a linearly polarized channel is not protected against multipath interference, and is easily suppressed in the case where radio waves pass through a linear-lattice shaped radio-wave obstacle in a certain direction. A linearly polarized beam also often changes in an artificial environment when encountering an inclined plane having anisotropic and semiconductor characteristics, which are general in modern construction materials such as an artificial paint and coating. A change from a linearly polarized wave to an elliptical and rotating polarized plane may have an adverse effect on a communication channel or a radar response.

In contrast, use of a circularly polarized wave in a communication channel may be contributory to improve the quality of the communication channel or radar measurement. Effects of switching over the rotation direction of a circularly polarized wave have been used for eliminating parasitic reflection in a receiving antenna since the pioneering era of radio communication. A system with a circularly polarized wave can pass a circularly polarized wave through scattered obstacles in a better state even if an antenna gain thereof is lower than usual antenna gain, which becomes a more preferred solution. Since an antenna system is resistant to a change in the ellipticity of a reflected wave under unpredictable condition, a circularly polarized wave antenna can be one desired option in application to a radar. However, an arbitrary application using a circularly polarized wave antenna is extremely sensitive to the rotation direction of a polarized wave. Basically, due to this, circularly polarized wave antennas are used in a predetermined polarized wave rotation direction in many cases. In addition, implementing a polarization rotation switchover function for a circularly polarized wave antenna while maintaining easiness of design is a specific challenge in antenna techniques.

In a conventional antenna technique, although a system becomes rather complicated, a circularly polarized wave antenna can be realized by configuring a pair of linearly polarized wave antennas so as to be arranged like a crossed dipole with phase difference of 90 degrees.

As a natural method for achieving a circularly polarized wave, a method is considered which artificially forms electric field vectors in a uniform direction on a plane, and further rotates a polarized wave within the plane. Whereas, a zeroth-order resonance antenna in a two-dimensional plane using a metamaterial is well-known for having an even electric field distribution within a resonator. However, this antenna with a mushroom structure well-known as a two-dimensional zeroth-order resonance metamaterial operates as an electric dipole directed in the direction vertical to the two-dimensional plane, and shows a characteristic of vertically polarized radiation and furthermore omnidirectional radiation on a horizontal plane. In order to realize a circularly polarized wave using such a configuration, it is necessary to further add radiation having an electric field component in the horizontal direction different in phase by 90 degrees. So far, a circularly polarized wave antenna has been realized by inserting a metal thin wire in the outer edge of the mushroom structure so that a line current flows in parallel to the horizontal plane, and giving the function similar to that of a crossed dipole. It is noted that this antenna is essentially omnidirectional, and it is impossible to make the antenna have a directional pattern or to give to the antenna a function to switch over the rotation direction of the polarized wave.

In the present embodiment, it is proposed that magnetic field vectors H directed substantially in the same direction be artificially formed within a plane of a planar antenna. The antenna of this case can be explained as a magnetic dipole rotating above a ground plane. The circularly polarized wave antenna proposed here can realize circularly polarized radiation having a narrow beam with high gain by using a relatively compact and simple design theory. Due to similarity with a non-reciprocal CRLH metamaterial structure, since the density of current flowing through a metal is smaller than that in a conventional mushroom structure, a lower material loss is expected. The unique characteristic of this non-reciprocal metamaterial antenna is the fact that it is possible to instantly switch over polarization rotation from left-hand circular polarization (LHCP) to right-hand circular polarization (RHCP), and vice versa.

2. Basic Principle and Operation Principle of Non-Reciprocal Transmission Line Apparatus First, the basic configuration and the operation principle of the non-reciprocal transmission line apparatus used in a circularly polarized wave antenna apparatus according to the present embodiment will be described below with reference to FIGS. 1 to 12. Note that mathematical equations indicated in the present specification are identified by parenthesized numbers positioned after equations, respectively.

Non-reciprocal transmission line apparatuses 70A to 70N according to the respective embodiments of the present invention are configured by cascade connecting unit cells of a transmission line. FIGS. 1 to 4 are equivalent circuit diagrams of unit cells 60A to 60D of exemplary transmission lines in a non-reciprocal transmission line apparatus according to an embodiment of the present invention. In this case, each unit cell is configured to include a transmission line part having a non-reciprocal phase-shift characteristic of different forward and backward propagation constants, and configured such that a capacitive element is equivalently inserted in a series branch circuit and an inductive element is equivalently inserted in a shunt branch circuit (see FIGS. 1 to 4). The circuit or apparatus, to which the configuration of such a non-reciprocal transmission line apparatus according to the invention of the present application can be applied, includes: printed board circuits, waveguides, and dielectric lines for use in microwave, millimeter wave, submillimeter wave, terahertz wave, such as strip lines, microstrip lines, slot lines, and coplanar lines, and further includes: all sorts of configurations supporting a waveguide mode or an evanescent mode, including plasmon, polariton, magnon, or the like; combinations thereof, and free spaces capable of being considered as their equivalent circuit. For example, electromagnetic waves transmitted by the non-reciprocal transmission line apparatus include microwaves, millimeter waves, submillimeter waves, and terahertz waves in the frequency bands of the UHF (Ultra High Frequency) band or higher, and in the present specification, these electromagnetic waves are collectively referred to as "microwave".

The non-reciprocal transmission line apparatus having the non-reciprocal phase-shift characteristic is configured by including such a transmission line among the aforementioned transmission lines that is configured to particularly include gyrotropic materials in part or as a whole, and to be magnetized in a magnetization direction different from a propagation direction of the electromagnetic wave (more preferably, in a direction orthogonal to the propagation direction) to be asymmetric with respect to a plane formed of the above propagation direction and the above magnetization direction. In addition to such a transmission line, a lumped-parameter element, having an equivalent non-reciprocal phase-shift function and being sufficiently small as compared to a wavelength, is also available as a transmission line having an equivalent non-reciprocal phase-shift characteristic. The gyrotropic materials include all the materials in which a dielectric constant tensor, a permeability tensor, or both of them exhibit gyrotrophy due to spontaneous magnetization, magnetization produced by an externally supplied DC or low-frequency magnetic field, or an orbiting free charge. Exemplary and specific gyrotropic materials include: ferrimagnetic materials such as ferrite, ferromagnetic materials, solid-state plasma (semiconductor materials etc.), liquid and gaseous plasma media, and magnetic artificial media made by micromachining or the like, for use in microwaves, millimeter waves, and the like.

The capacitive element inserted in the series branch circuit may include a capacitor commonly used in electric circuits, a distributed-parameter capacitance element for microwaves, millimeter waves, and the like, and may include equivalent circuits or circuit elements having a negative effective permeability for the electromagnetic wave mode of propagation through the transmission line. In order to obtain the negative effective permeability, the series branch circuit should be equivalent to a line dominantly operating as a capacitive element. Concrete examples of elements having the negative effective permeability include: a spatial arrangement including at least one magnetic resonator such as a split ring resonator made of metal and a spiral structure; a spatial arrangement of a magnetically resonating dielectric resonator; or a microwave circuit operable in the waveguide mode or the evanescent mode having the negative effective permeability, such as an edge mode of propagation along a ferrite substrate microstrip line. Further, as other examples, the capacitive element inserted in the series branch circuit may be a series or parallel connection of capacitive elements and inductive elements, or a combination of their series and parallel connections. The element to be inserted or the circuit to which the element is inserted may be capacitive as a whole.

As the inductive element inserted in the shunt branch circuit, not only a lumped-parameter element such as a coil used in electrical circuits, and a distributed-parameter inductive element such as a short-circuit stub conductor used for microwaves, millimeter waves, and the like, but also a circuit or an element having a negative effective dielectric constant for the electromagnetic wave mode of propagation through the transmission line may be used. In order to show the negative effective dielectric constant, the shunt branch should be equivalent to a transmission line dominantly operating as an inductive element. Concrete examples of elements having the negative effective dielectric constant include: a spatial arrangement including a least one electric resonator of a metal thin wire, a metal sphere, and the like; a spatial arrangement of an electrically resonating dielectric resonator other than metal; or a microwave circuit operable in the waveguide mode or the evanescent mode having the negative effective dielectric constant, such as waveguides and parallel planar lines in which the TE mode is in a blocking region. In addition, as other examples, the inductive element inserted in the shunt branch circuit may be a series or parallel connection of capacitive elements and inductive elements, or a combination of their series and parallel connections. The element to be inserted or the circuit to which the element is inserted may be inductive as a whole.

The evanescent mode may occur in the transmission line apparatus having the non-reciprocal phase-shift characteristic in the case where the transmission line apparatus has the negative effective permeability for the electromagnetic wave mode of propagation through the transmission line. Since the negative effective permeability corresponds to the case where a capacitive element is inserted in the series branch circuit, the equivalent circuit of the transmission line includes both a non-reciprocal phase-shift part and a series capacitive element part.

The evanescent mode may occur in the transmission line apparatus having the non-reciprocal phase-shift characteristic in the case where the transmission line apparatus has the negative effective dielectric constant for the electromagnetic wave mode of propagation through the transmission line apparatus. Since the negative effective dielectric constant corresponds to the case where an inductive element is inserted in the shunt branch circuit, the equivalent circuit of the transmission line includes both the non-reciprocal phase-shift part and the shunt inductive element part.

Figure 2:
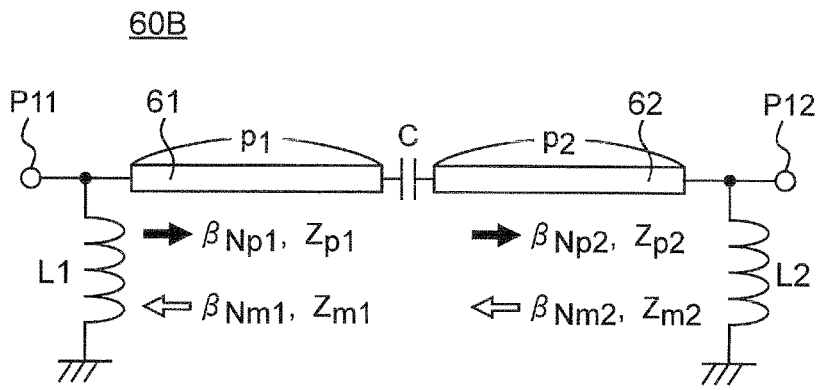
FIG. 2 is an equivalent circuit diagram of a unit cell 60B of a second exemplary transmission line in the non-reciprocal transmission line apparatus according to the embodiment of the present invention.
Figure 3:
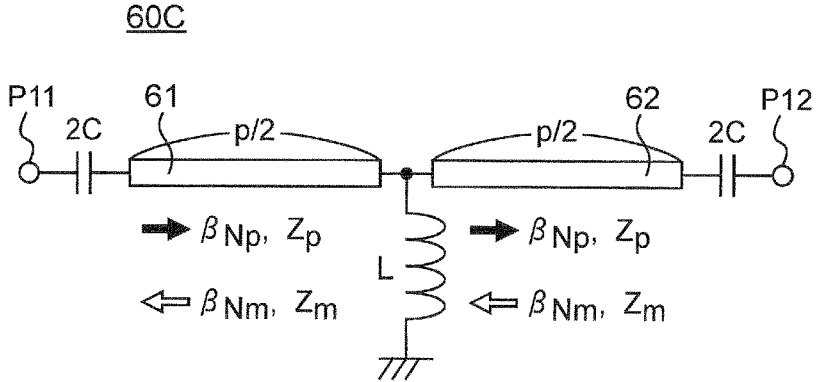
FIG. 3 is an equivalent circuit diagram of a unit cell 60C of a third exemplary transmission line in the non-reciprocal transmission line apparatus according to the embodiment of the present invention.
Figure 4:
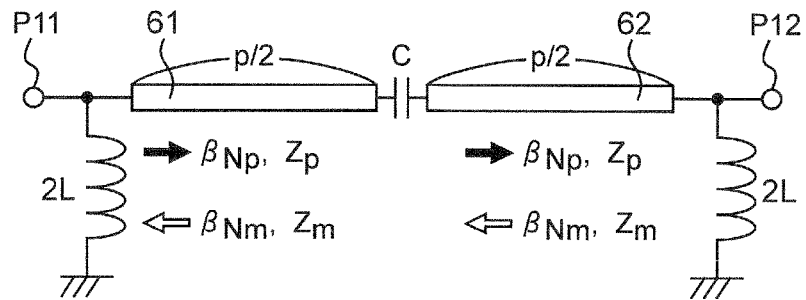
FIG. 4 is an equivalent circuit diagram of a unit cell 60D of a fourth exemplary transmission line in the non-reciprocal transmission line apparatus according to the embodiment of the present invention.

FIGS. 1 and 2 show the cases where the unit cells 60A and 60B have an asymmetric T-structure and an asymmetric π-structure, respectively. In addition, FIGS. 3 and 4 show the simpler cases where the unit cells 60C and 60D have a symmetric T-structure and a symmetric π-structure, respectively. Hereinafter, it is assumed in principle that the line length of each of the unit cells 60A to 60D (i.e., period length p=p1+p2) is sufficiently small with respect to the wavelength. Therefore, essentially the similar result will be obtained for any of the T-structure, the π-structure, or an L-structure, in a manner similar to that in the case of unit cells of a transmission line in the composite right/left-handed transmission line apparatus according to the prior art. In fact, the L-structure falls under the case of FIG. 1 or 2 with parameters being set. Note that it is emphasized that the line length of each of the unit cells 60A to 60D with respect to the wavelength does not restrict the basic operation described here.

FIGS. 1 to 4 show simple line structures, where a capacitive element or a capacitive circuit network is inserted in the series branch circuit of the transmission line including two transmission line parts 61 and 62 having predetermined line lengths (the line lengths of FIGS. 1 and 2 are p1 and p2, respectively, and both the line lengths of FIGS. 3 and 4 are p/2), and an inductive element or an inductive circuit network is inserted in the shunt branch circuit of the transmission line. FIG. 1 shows capacitors C1 and C2, and an inductor L inserted in the transmission line, in order to simply and collectively represent the effective size (line length) of these elements. Similarly, FIG. 2 shows a capacitor C and inductors L1 and L2 inserted in the transmission line. Each of the transmission line parts 61 and 62 is configured to have a non-reciprocal phase-shift characteristic of different forward and backward propagation constants. When considering the propagation constants in the present specification, the imaginary part of the propagation constants, i.e., the phase constant is used. As parameters indicative of the non-reciprocity of the transmission line part 61, $\beta_{Np1}$ and $Z_{p1}$ denote a forward phase constant and a forward characteristic impedance ("forward" means a direction from a port P11 to a port P12), respectively, and $\beta_{Nm1}$ and $Z_{m1}$ denote a backward phase constant and a backward characteristic impedance ("backward" means a direction from the port P12 to the port P11), respectively. Similarly, as parameters indicative of the non-reciprocity of the transmission line part 62, $\beta_{Np2}$ and $Z_{p2}$ denote a forward phase constant and a forward characteristic impedance, respectively, and $\beta_{Nm2}$ and $Z_{m2}$ denote a backward phase constant and a backward characteristic impedance, respectively. Each of the transmission lines of FIGS. 1 and 2 has two asymmetric transmission line parts 61 and 62. On the other hand, each of the transmission lines of FIGS. 3 and 4 has two symmetric transmission line parts 61 and 62, and satisfies: p1=p2=p/2, $\beta_{Np1}=\beta_{Np2}=\beta_{Np}$, $\beta_{Nm1}=\beta_{Nm2}=\beta_{Nm}$, $Z_{p1}=Z_{p2}=Z_p$, and $Z_{m1}=Z_{m2}=Z_m$. Further, a transmission line of T-structure satisfies C1=C2=2C, and a transmission line of π-structure satisfies L1=L2=2L. Specifically, by imposing periodic boundary conditions to both ends of the unit cells 60A to 60D of the transmission lines of FIGS. 3 and 4, the following equation is obtained.

$$\cos\left[\left(\beta-\frac{\Delta\beta}{2}\right)\cdot p\right] = \left(1-\frac{1}{\omega^2 \cdot L \cdot C} \cdot \frac{Z_p \cdot Z_m}{(Z_p+Z_m)^2}\right)\cdot\cos(\bar{\beta}\cdot p) + \frac{1}{Z_p+Z_m}\left(\frac{Z_p \cdot Z_m}{\omega \cdot L}+\frac{1}{\omega \cdot C}\right)\cdot\sin(\bar{\beta}\cdot p) - \frac{1}{2\cdot\omega^2 \cdot L \cdot C}\cdot\frac{Z_p^2 \cdot Z_m^2}{(Z_p+Z_m)^2} \quad (1)$$

where, $\Delta\beta$ and $\bar{\beta}$ are given as follows.

$$\Delta\beta = \beta_{Np} - \beta_{Nm}$$

$$\bar{\beta} = \frac{\beta_{Np} + \beta_{Nm}}{2}$$

ω denotes an operating angular frequency, and β denotes the phase constant of an electromagnetic wave propagating along a periodic structure. Equation (1) denotes the relation between operating angular frequency ω and phase constant β. Therefore, equation (1) is an equation of dispersion (ω–β diagram).

Assuming the reciprocity ($\beta_{Np}=\beta_{Nm}$ and $Z_p=Z_m$) in mathematical equation (1), the transmission line becomes the same as that of the reciprocal transmission line apparatus according to the prior art, and mathematical equation (1) is simplified as follows.

$$\cos(\beta \cdot p) = \cos(\beta_{Np} \cdot p) - \frac{1}{2\cdot\omega^2 \cdot L \cdot C}\cdot\cos^2\left(\frac{\beta_{Np}\cdot p}{2}\right) + \frac{j}{2}\cdot\left(\frac{Y}{Y_p}+\frac{Z}{Z_p}\right)\cdot\sin(\beta_{Np}\cdot p) \quad (2)$$

It is noted that it is assumed that in mathematical equation (2), admittance Y=1/jωL, and impedance Z=1/jωC.

Figure 5:
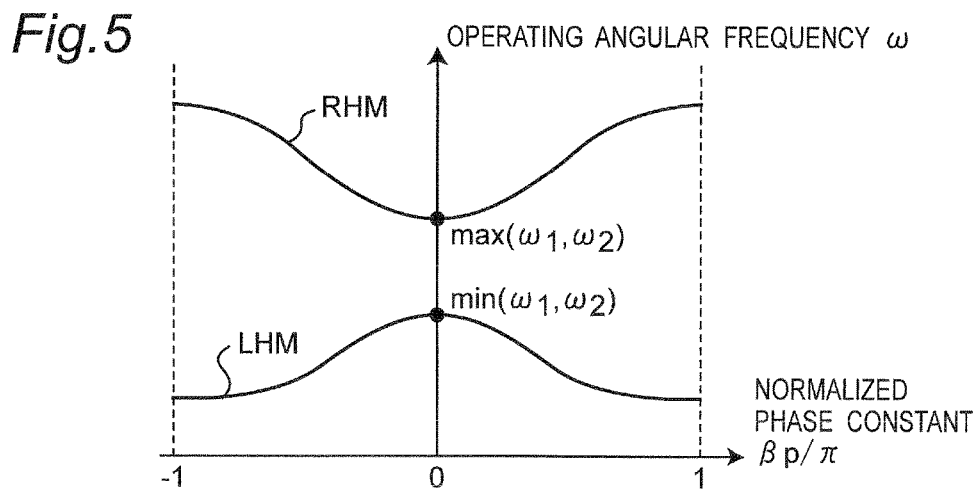
FIG. 5 is a graph showing dispersion curves of a reciprocal transmission line apparatus according to the prior art in an unbalanced state.
Figure 6:
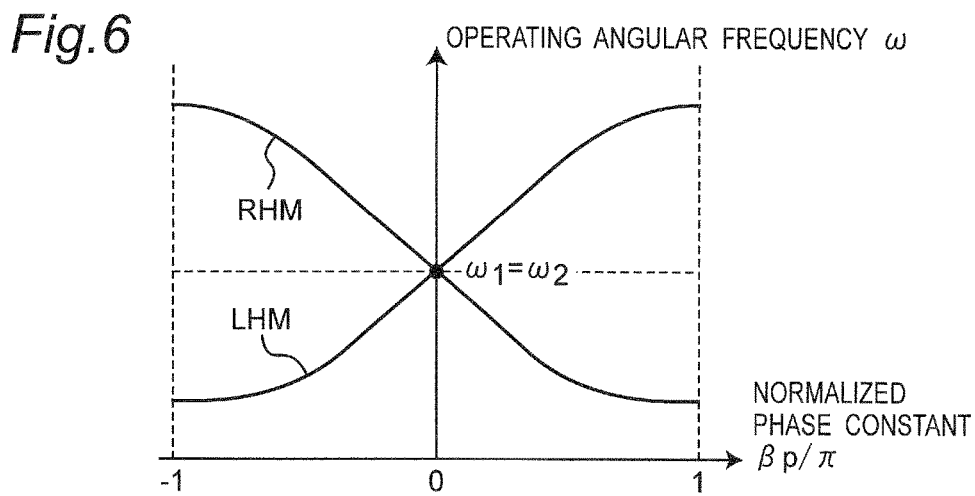
FIG. 6 is a graph showing dispersion curves of the reciprocal transmission line apparatus according to the prior art in a balanced state.

FIG. 5 is a graph showing dispersion curves of the reciprocal transmission line apparatus according to the prior art in an unbalanced state. FIG. 6 is a graph showing dispersion curves of the reciprocal transmission line apparatus according to the prior art in a balanced state. The graphs of FIGS. 5 and 6 indicate the characteristic of angular frequency ω versus normalized phase constant β·p/π. FIG. 5 shows typical dispersion curves in the case of the reciprocal transmission line apparatus according to the prior art denoted by equation (2), and in general, a forbidden band appears between a band with a right-handed (RH) transmission characteristic and a band with a left-handed (LH) transmission characteristic. The frequency at the upper limit of the left-handed transmission band and the frequency at the lower limit of the right-handed transmission band are obtained as the solutions of a quadratic equation of angular frequency $\omega^2$, by imposing the condition of phase constant β=0 on equation (2). As a result, the following two solutions are obtained.

$$\omega_1 = \sqrt{\frac{1}{L\cdot\varepsilon_p \cdot p}} \quad (3)$$

$$\omega_2 = \sqrt{\frac{1}{C\cdot\mu_p \cdot p}} \quad (4)$$

where, $\varepsilon_p$ and $\mu_p$ denote the effective dielectric constant and the effective permeability of the transmission line parts 61 and 62 in the unit cells 60A to 60D. Therefore, in order for cutoff frequencies to satisfy $\omega_1=\omega_2$ with no forbidden band, it is only necessary for equation (2) to have a multiple root under the condition of phase constant β=0, and as a result, the following equation is obtained.

$$Z_p = \sqrt{\frac{\mu_p}{\varepsilon_p}} = \sqrt{\frac{L}{C}} \quad (5)$$

According to the result of equation (5), no gap appears if impedance √(L/C) of the capacitor C and the inductor L is identical to characteristic impedances $Z_p$ of the transmission line parts 61 and 62 to which the capacitor C and the inductor L are inserted, where the capacitor C is the capacitive element inserted in the series branch circuit, and the inductor L is the inductive element inserted in the shunt branch circuit. Equation (5) is a kind of condition for impedance matching. FIG. 6 shows the dispersion curves of that case.

The dispersion curves of the non-reciprocal transmission line apparatus given by equation (1) will be described below. In the case of a reciprocal transmission line apparatus, it is shown according to equation (2) that the dispersion curves are symmetric with respect to the straight line of phase constant β=0 (ω axis). On the other hand, in the case of the non-reciprocal transmission line apparatus, it is readily shown according to the left side of equation (1) that the axis of symmetry of the dispersion curves is shifted with respect to β the positive direction from the straight line of β=0 by:

$$\beta_{NR} = \frac{\Delta\beta}{2} = \frac{\beta_{Np}-\beta_{Nm}}{2} \quad (6)$$

Hereinafter, $\beta_{NR}$ is referred to as a non-reciprocal phase-shift amount. As a result, FIG. 7 is obtained corresponding to FIG. 5.

Figure 7:
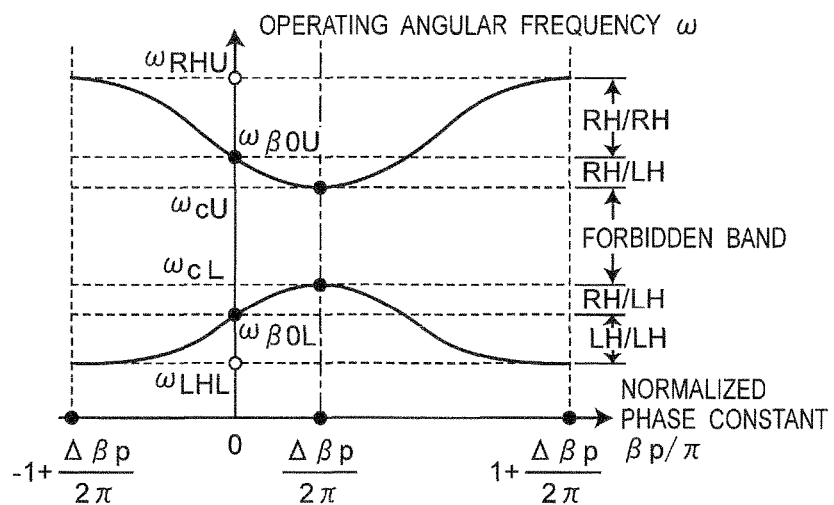
FIG. 7 is a graph showing dispersion curves of the non-reciprocal transmission line apparatus according to the embodiment in an unbalanced state.
Figure 8:
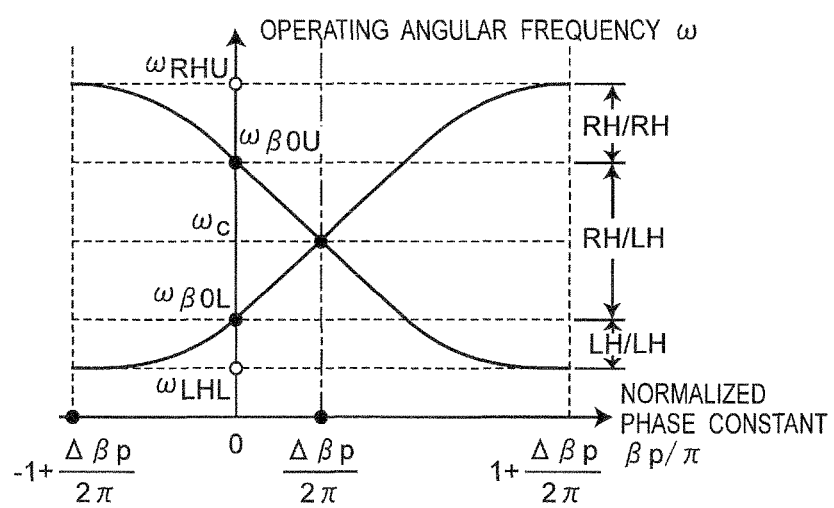
FIG. 8 is a graph showing dispersion curves of the non-reciprocal transmission line apparatus according to the embodiment in a balanced state.

FIG. 7 is a graph showing dispersion curves of the non-reciprocal transmission line apparatus according to the embodiment in an unbalanced state. FIG. 8 is a graph showing dispersion curves of the non-reciprocal transmission line apparatus according to the embodiment in a balanced state.

In this manner, the non-reciprocal transmission line apparatus is significantly different from the reciprocal transmission line apparatus in that the axis of symmetry (depicted by a dashed line in the figure) of the dispersion curves is shifted from the ω axis to the right or the left, because of forward phase constant $\beta=\beta_p$ and backward phase constant $\beta=\beta_m$ obtained from equation 1 satisfying $\beta_p \neq \beta_m$ (thus, the forward and backward propagation constants are different from each other), i.e., the effect of a non-reciprocal phase-shift. Note that non-reciprocal phase-shift amount $\beta_{NR}$ can also be represented as $$\beta_{NR} = \frac{\Delta\beta}{2} = \frac{\beta_p - \beta_m}{2}$$

in lieu of equation (6) using forward and backward phase constants $\beta_p$ and $\beta_m$. As a result, the transmission bands are classified into the following five transmission bands (A) to (E).

(A) Both the forward and backward propagations are done as the left-handed transmission (LH/LH). It is noted that the magnitudes of the propagation constants are different from each other.

(B) The forward propagation is done as the left-handed transmission, and the backward propagation has zero propagation constant and infinite guide wavelength.

(C) The forward propagation is done as the left-handed transmission, and the backward propagation is done as the right-handed transmission (RH/LH).

(D) The forward propagation is done as the right-handed transmission, and the backward propagation has zero propagation constant and infinite guide wavelength.

(E) Both the forward and backward propagations are done as the right-handed transmission (RH/RH). It is noted that the magnitudes of the propagation constants are different from each other.

It is noted that, in general, a stop band (forbidden band) appears at the center of transmission band (C) as shown in FIG. 7. In addition, in particular, when using the transmission band indicated by RH/LH in FIGS. 7 and 8, there is an advantageous feature that even if supplying microwave signals to both the ports in both directions (the forward and backward directions), the flows of phase have a predetermined identical direction (left-handed transmission and right-handed transmission).

Considering the case of the reciprocal transmission line apparatus of the prior art for the purpose of comparison, two identical modes with positive and negative directions of the power transmission intersect each other without coupling between the two modes, in the case where the matching condition of equation (5) is satisfied, i.e., at the point where phase constant $\beta=0$ as shown in FIG. 6. Similarly, on the axis of symmetry $\beta=\Delta\beta/2=\beta_{NR}$ of the dispersion curves of equation (1), equation (1) is a quadratic equation with respect to angular frequency $\omega^2$. By imposing a condition of a multiple root in order to avoid a band gap, the following equation is obtained.

$$Z_p = \sqrt{\frac{\mu_p}{\varepsilon_p}} = \sqrt{\frac{L}{C}} \text{ or} \qquad (7)$$

$$Z_m = \sqrt{\frac{\mu_m}{\varepsilon_m}} = \sqrt{\frac{L}{C}}$$

It is noted that $\varepsilon_p$ and $\mu_p$ denote the forward effective dielectric constant and the forward effective permeability of the non-reciprocal transmission line parts 61 and 62 in the unit cells 60A to 60D, respectively, and $\varepsilon_m$ and $\mu_m$ denotes their backward effective dielectric constant and the backward effective permeability, respectively. According to equation (7), the condition for avoiding a gap near the intersection of the two modes is a condition for impedance matching, similarly to the case of equation (5) of the reciprocal transmission line apparatus. Moreover, it is only necessary to insert the inductor L and the capacitor C so that matching is made in either the forward direction or the backward direction, and there is an advantageous feature that a weaker condition of impedance matching is imposed than in the case of the reciprocal transmission line apparatus.

A more general case of two asymmetric transmission line parts 61 and 62 as shown in FIGS. 1 and 2 will be briefly described below. Even in such an asymmetric case, its basic operation depends on dispersion curves similar to those shown in FIGS. 7 and 8. The position of the axis of symmetry of dispersion curves is modified to the position of the following equation on the normalized phase constant $\beta \cdot p/\pi$ of the horizontal axes of FIGS. 7 and 8.

$$\frac{\beta \cdot p}{\pi} = \frac{(\beta_{Np1} - \beta_{Nm1}) \cdot p_1}{2\pi} + \frac{(\beta_{Np2} - \beta_{Nm2}) \cdot p_2}{2\pi}$$

In addition, in the case where the two non-reciprocal transmission line parts 61 and 62 have an identical propagation characteristic, a matching condition for avoiding a band gap is the same as that of equation (7). It is noted that the condition in the case of FIG. 1 is:

$$\frac{1}{C} = \frac{1}{C1} + \frac{1}{C2}$$

and the condition in the case of FIG. 2 is:

$$\frac{1}{L} = \frac{1}{L1} + \frac{1}{L2}$$

Figure 9:
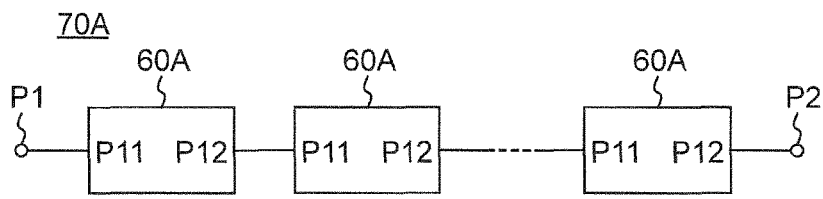
FIG. 9 is a block diagram showing a configuration of a non-reciprocal transmission line apparatus 70A configured by cascade connecting the unit cells 60A of FIG. 1.
Figure 10:
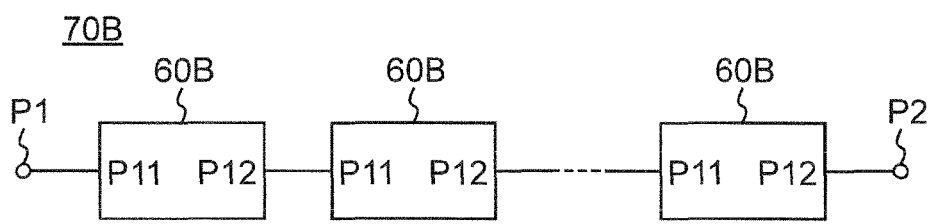
FIG. 10 is a block diagram showing a configuration of a non-reciprocal transmission line apparatus 70B configured by cascade connecting the unit cells 60B of FIG. 2.
Figure 11:
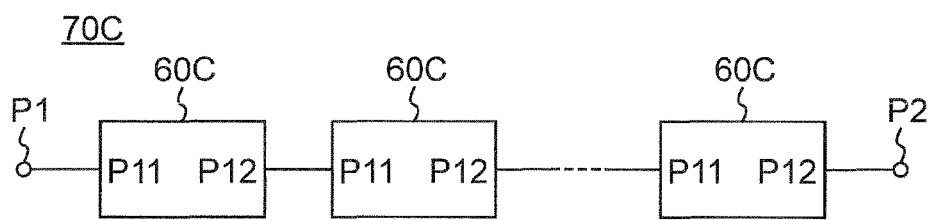
FIG. 11 is a block diagram showing a configuration of a non-reciprocal transmission line apparatus 70C configured by cascade connecting the unit cells 60C of FIG. 3.
Figure 12:
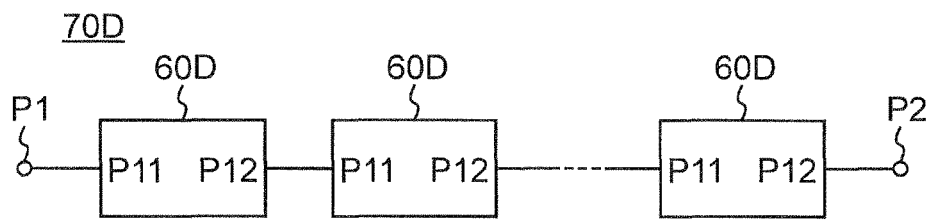
FIG. 12 is a block diagram showing a configuration of a non-reciprocal transmission line apparatus 70D configured by cascade connecting the unit cells 60D of FIG. 4.

As shown in FIGS. 9 to 12, an entire non-reciprocal transmission line apparatus according to an embodiment of the present invention is configured by including at least one of pluralities of unit cells 60A to 60D of FIGS. 1 to 4, and by cascade connecting them. FIG. 9 is a block diagram showing a configuration of a non-reciprocal transmission line apparatus 70A configured by cascade connecting the unit cells 60A of FIG. 1. In FIG. 9, the non-reciprocal transmission line apparatus 70A is configured by cascade connecting the plurality of unit cells 60A between the port P1 and the port P2. FIG. 10 is a block diagram showing a configuration of a non-reciprocal transmission line apparatus 70B configured by cascade connecting the plurality of the unit cells 60B of FIG. 2. In FIG. 10, the non-reciprocal transmission line apparatus 70B is configured by cascade connecting the plurality of unit cells 60B between the port P1 and the port P2. FIG. 11 is a block diagram showing a configuration of a non-reciprocal transmission line apparatus 70C configured by cascade connecting the plurality of the unit cells 60C of FIG. 3. In FIG. 11, the non-reciprocal transmission line apparatus 70C is configured by cascade connecting the plurality of unit cells 60C between the port P1 and the port P2. FIG. 12 is a block diagram showing a configuration of a non-reciprocal transmission line apparatus 70D configured by cascade connecting the plurality of the unit cells 60D of FIG. 4. In FIG. 12, the non-reciprocal transmission line apparatus 70D is configured by cascade connecting the plurality of unit cells 60D between the port P1 and the port P2. Note that even in the case of cascade connecting the plurality of unit cells 60A to 60D, it is not necessary that the non-reciprocal transmission line apparatus be configured of only one type of the unit cells 60A to 60D, and it is possible to cascade connect a combination of different types of the unit cells.

Hereinafter, dispersion curves of the non-reciprocal transmission line apparatuses 70A to 70E according to the present embodiment and the following embodiments are dispersion curves in a balanced state as shown in FIG. 8. In addition, in the dispersion curves in FIG. 8, operating angular frequency ω at the intersection of the two modes is defined as central angular frequency $\omega_C$ and non-reciprocal phase-shift amount $\beta_{NR}$ at the intersection is defined as non-reciprocal phase-shift amount $\beta_{NRC}$. It is noted that the non-reciprocal transmission line apparatuses 70A to 70E can operate even if the dispersion curves are in an unbalanced state where a band gap exists as shown in FIG. 7. In this case, even though depending on conditions of termination on both sides of the transmission line, the angular frequency corresponding to central operating angular frequency $\omega_C$ in FIG. 7 corresponds to two angular frequencies $\omega_{cU}$ and $\omega_{cL}$ corresponding to band-gap ends of the dispersion curves of FIG. 8 or an angular frequency within the band gap between them.

3. Basic Configuration of Circularly Polarized Wave Antenna Apparatus

Figure 13A:
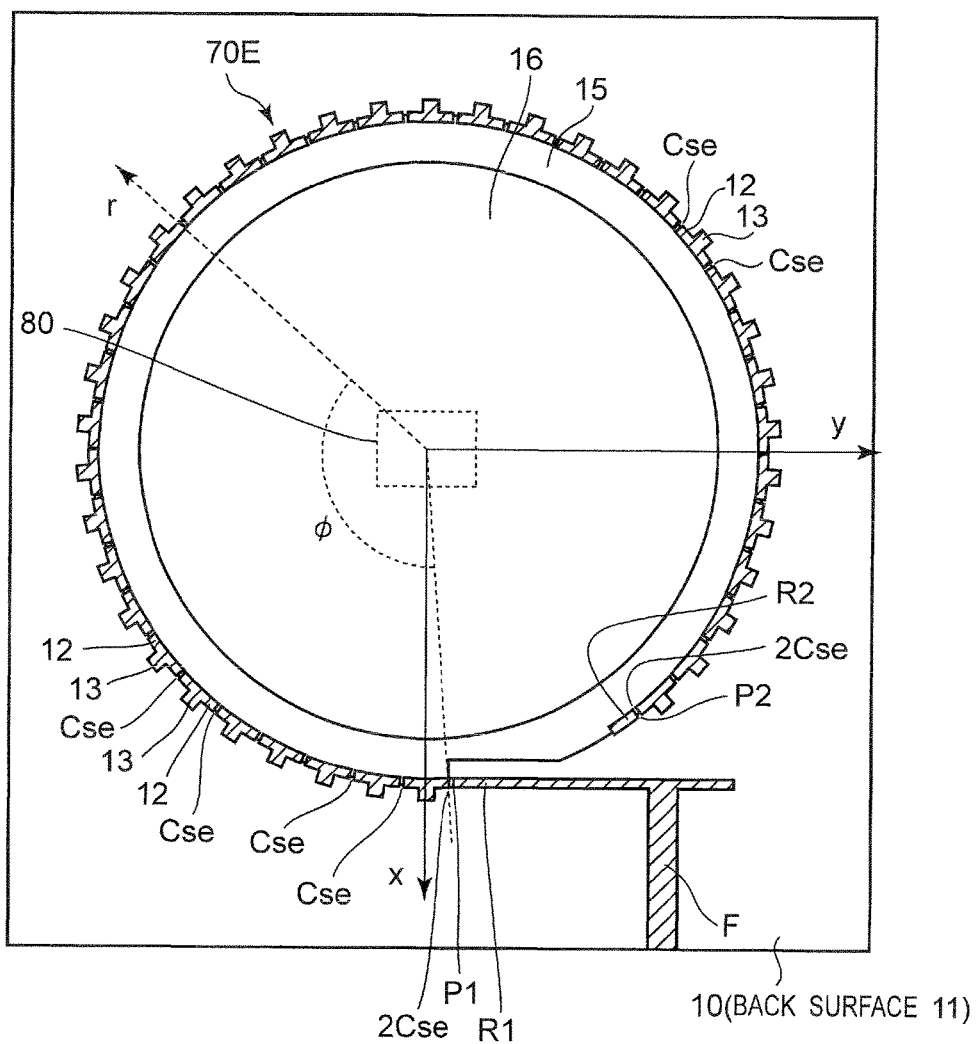
FIG. 13A is a plan view showing a configuration of a circularly polarized wave antenna apparatus using a non-reciprocal transmission line apparatus 70E according to an embodiment of the present invention.
Figure 13B:
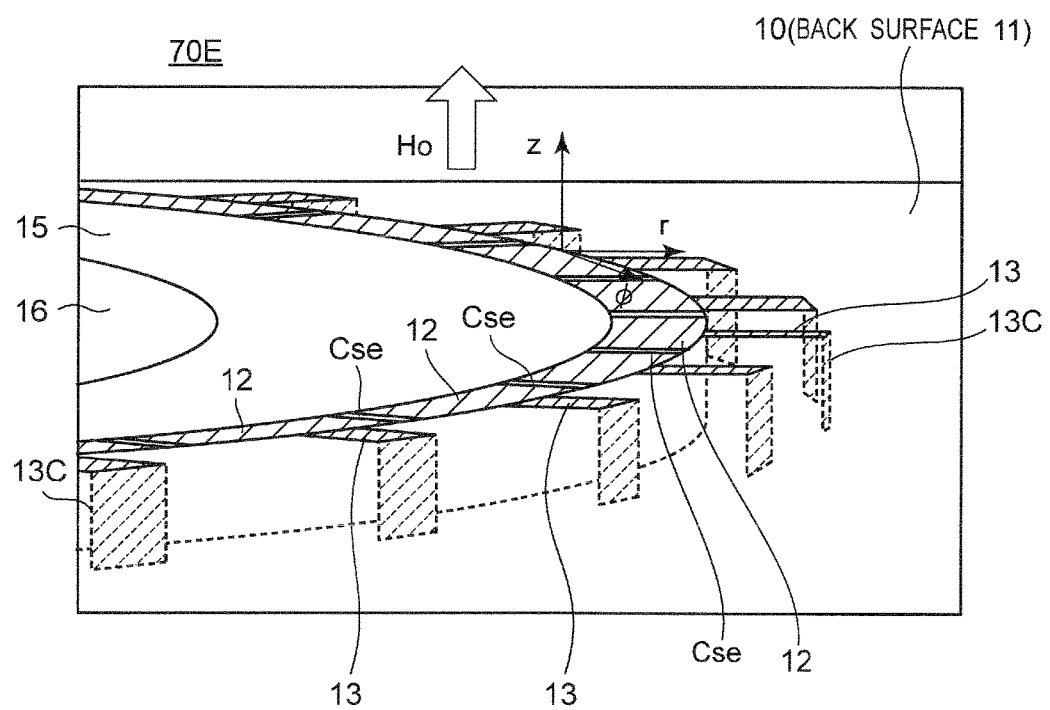
FIG. 13B is a perspective view showing a partial configuration of the circularly polarized wave antenna apparatus of FIG. 13A.

FIG. 13A is a plan view showing a configuration of a circularly polarized wave antenna apparatus using a non-reciprocal transmission line apparatus 70E according to an embodiment of the present invention. FIG. 13B is a perspective view showing a partial configuration of the circularly polarized wave antenna apparatus of FIG. 13A. The circularly polarized wave antenna apparatus according to the present embodiment includes the non-reciprocal transmission line apparatus 70E, reflectors R1 and R2 at both ends, and a feed line F. In the non-reciprocal transmission line apparatus 70E, a microstrip line having a strip conductor 12 formed on a disc-shaped vertically magnetized ferrite plate 15 is arranged along the circumference of the ferrite plate 15. A non-reciprocal transmission line apparatus 70E including the microstrip line has a structure in which capacitors Cse are periodically inserted in a series branch and inductive short-circuited stub conductors 13 (the stub conductor 13 is formed on a dielectric substrate 10 having a ground conductor 11 on the back surface thereof and the leading end thereof is short-circuited to the ground conductor 11 via a via conductor 13C) are periodically inserted in shunt branches. An edge guided mode of propagation along the microstrip line having the vertically magnetized ferrite plate 15 shows non-reciprocity depending on the propagation direction due to asymmetry of the structure. On both ends of the non-reciprocal transmission line apparatus 70E, substantial short-circuit conditions are imposed as boundary conditions. Further, one end of the non-reciprocal transmission line apparatus 70E becomes a port P1 via a capacitor 2Cse, and the feed line F is directly inserted and connected via the reflector R1 to the port P1 at a position where impedance matching is made. Furthermore, the other end of the non-reciprocal transmission line apparatus 70E becomes a port P2 via a capacitor 2Cse, and the reflector R2 is connected to the port P2.

The proposed circularly polarized wave antenna apparatus having a polarization rotation switchover function configures a pseudo-circulating beam antenna apparatus, and the antenna apparatus uses pseudo-travelling wave resonance in a non-reciprocal metamaterial structure. The point of difference from a linear non-reciprocal transmission line apparatus according to the prior art is that the microstrip line of the circularly polarized wave antenna apparatus according to the present embodiment is bent into a ring shape as shown in FIG. 13A. In this case, the microstrip line is formed at a peripheral edge part of the ferrite plate 15.

Such a structure is selected due to the following two reasons. First, the structure of the ferrite plate 15 made of a ferrite core is simple and is purely practical. The other reason is that there is a possibility that phase-shift is realized by including a fringe electric field in non-reciprocal propagation by slightly increasing the magnitude of non-reciprocity. In order to prevent generation of an unnecessary leaky wave from the high dielectric constant ferrite plate 15, the ferrite plate 15 is covered with a circular shielding metal plate 16 for shielding. In this case, it is not necessary to ground the shielding metal plate. This is because an average voltage potential on the surface of the shielding metal plate is nearly zero since the electromagnetic field distribution within the ferrite plate has a symmetric structure. In order to prevent the generation of a slot waveguide mode, it is necessary to provide a substantially great gap between the shielding metal plate and the transmission line. Loads each constituted of the stub conductor 13 of a shunt branch are periodically inserted in the microstrip line. The plurality of lumped-parameter series capacitors Cse is inserted in a gap along the microstrip line of the non-reciprocal transmission line apparatus 70E. In addition, power is fed to the non-reciprocal transmission line apparatus 70E from the feed line F via the reflector R1 made of a 3λ/4 reflector and the port P1. The load impedance at a connecting part of the reflector R1 with the input end of the non-reciprocal transmission line apparatus 70E at the operating frequency is substantially zero. In order to prevent unnecessary radiated waves from the reflector R1, the reflector R1 is covered with a shielding metal plate (not shown). The load impedance of the other reflector R2 of a λ/4 resonator is 0 at a mounting part for the end part port P2 on the opposite side of the non-reciprocal transmission line apparatus 70E, which satisfies end short-circuit conditions.

Note that the internal magnetization of the ferrite plate 15 is directed in the vertical direction from the lower surface to the upper surface. However, instead of the internal magnetization of the ferrite plate 15, an external variable magnetic field may be applied in the vertical direction using an external magnetic field generator 80.

Since the non-reciprocal transmission line apparatus 70E is short-circuited at both ends, series resonance in the series branch becomes dominant in pseudo-travelling wave resonance. As a result, the size of each of electric field components Ez distributed along the non-reciprocal transmission line apparatus 70E becomes nearly zero and minimized in the region of each strip conductor 12. On the other hand, the size of magnetic field component Hr in the horizontal direction is maximized in a manner similar to that of magnetic field H within a pseudo-travelling wave resonator. In addition, since the pseudo-travelling wave resonator operates as a zeroth-order resonator when a bias magnetic field is not applied to the ferrite plate 15, magnetic field components Hr, in the horizontal direction are centrosymmetric, and the magnetic field vectors are directed in a moving radius direction. As a result, radiated waves from the resonator interfere with each other and weaken each other, and radiation is offset.

Figure 14A:
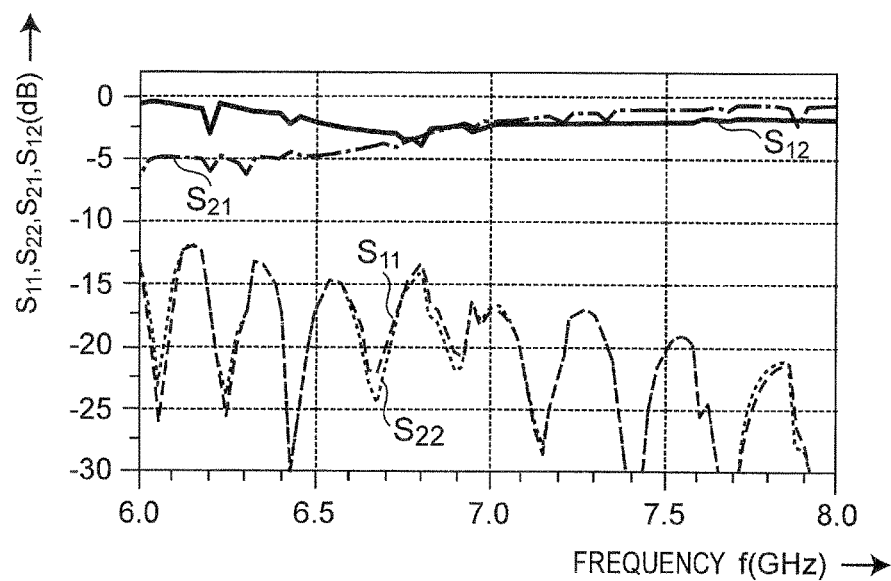
FIG. 14A is a graph showing simulation results of the non-reciprocal transmission line apparatus 70E used in the circularly polarized wave antenna apparatus of FIGS. 13A and 13B, and showing frequency characteristics of S parameters.
Figure 14B:
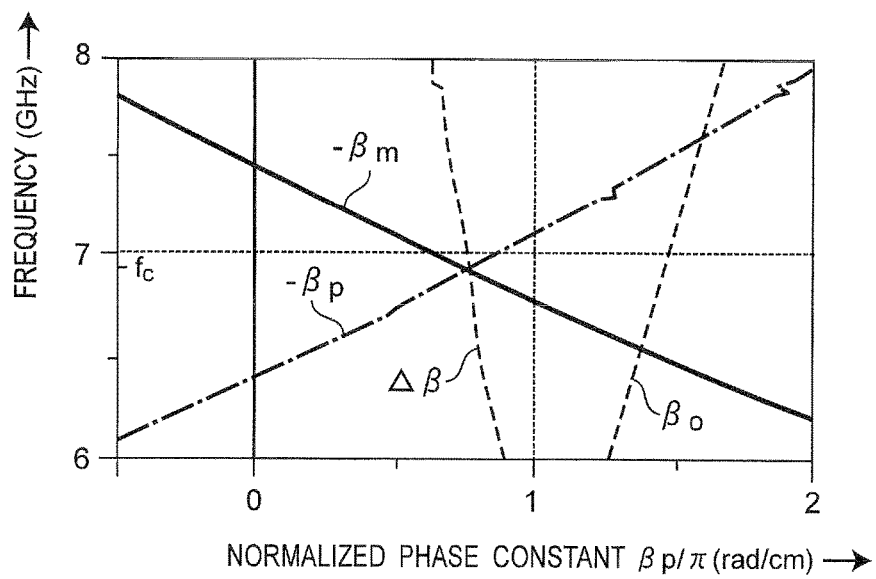
FIG. 14B is a graph showing simulation results of the non-reciprocal transmission line apparatus 70E used in the circularly polarized wave antenna apparatus of FIGS. 13A and 13B, and showing dispersion characteristics.

FIGS. 14A and 14B show simulation results of the non-reciprocal transmission line apparatus 70E used in the circularly polarized wave antenna apparatus of FIGS. 13A and 13B. FIG. 14A is a graph showing frequency characteristics of S parameters. FIG. 14B is a graph showing dispersion characteristics. The simulation is carried out with respect to the non-reciprocal transmission line apparatus 70E having 22 unit cells. FIG. 14B shows the dispersion characteristic of the non-reciprocal transmission line apparatus 70E magnetized at 4 πMs=1750 G (何故か分からないが、ここはGauss単位系).

As a condition for the circularly polarized wave antenna to operate, it is necessary to apply bias magnetic field Ho to the ferrite plate 15 in parallel to the z axis. It is possible to achieve phase-shift of ±2π radians with respect to an electrical length corresponding to one round of a divided ring configuring the resonator when the ferrite plate 15 reaches magnetization M of a certain level. This brings about an interesting effect of generating a pseudo-circulating wave in a circular structure due to equiphase conditions at both ends of the resonator. However, in reality, it is also necessary to take into consideration existence of a gap dividing the ring. That is, what is important to achieve circularly polarized radiation is to give a phase gradient of the line so that the phase-shift on the resonator is always the same as angle φ at polar coordinates of the structure of FIG. 13A. This causes magnetic field components Hr on opposite sides of the circular structure to be always directed in the same direction, and as a result, brings about strengthening interference between them. Magnetic field H distribution inside the ring of the non-reciprocal transmission line apparatus 70E is directed in substantially nearly one direction in terms of an instantaneous value. Further, the distribution rotates about a ring axis with the lapse of time. In a manner similar to that of a horizontal magnetic dipole where a shielding metal plate exists, this dipole ring signal source provides abeam radiating in a broadside direction in a far-field region. Rotation of the in-plane magnetic field imparts circular polarization characteristics to a beam formed in the broadside direction. The rotation direction of a polarized wave depends on a sign of the phase-shift in the resonator, and the sign is reversed just opposite by applying opposite bias magnetic field Ho. Such a characteristic is a novel function that a metamaterial antenna of this kind brings about.

4. Detailed Configuration and Modified Embodiment of Circularly Polarized Wave Antenna Apparatus A circularly polarized wave antenna apparatus according to the present embodiment includes a non-reciprocal transmission line apparatus 70E which is a non-reciprocal phase-shift composite right/left-handed line with a finite length, reflectors R1 and R2 connected to both ends thereof, and a feed line F. The non-reciprocal transmission line apparatus 70E constituting a pseudo-travelling wave resonator is constituted of single or a plurality of constituent element(s) called unit cell(s), and is characterized in the dispersion relation thereof. Dispersion curves of a right-handed mode and a left-handed mode having a relation in which the power transmission directions are opposite to each other intersect each other. The non-reciprocal transmission line apparatus 70E uses as an operating frequency a frequency band within a band gap appearing as a result of coupling, or a frequency around the frequency at an intersection between the two dispersion curves where no band gap appears. The operating frequency is irrespective of the line length constituting the resonator, and is nearly fixed around the intersection frequency determined by the dispersion curves.

The reflectors R1 and R2 connected to both ends of the non-reciprocal transmission line apparatus 70E reflect signals input thereto, respectively, and preferably, are not independent from each other but are set so as to satisfy one of the following conditions:

(1) a first condition of a substantially both-ends short-circuited state where the impedance of each of the reflectors R1 and R2 is substantially 0, specifically, 0 or a predetermined low impedance value ([ω], ohm) near 0, which is substantially 0 (here, although the low impedance value changes depending on other parameters, the low impedance value is a value equal to or smaller than a predetermined value such as 0.1, 0.01, and 0.001);

(2) a second condition of a substantially both-end open state where the admittance of each of the reflectors R1 and R2 is substantially 0, specifically, 0 or a predetermined low admittance value ([S] siemens) near 0, which is substantially 0 (here, although the low impedance value changes depending on other parameters, the low impedance value is a value equal to or smaller than a predetermined value such as 0.1, 0.01, and 0.001); and (3) a third condition constituted of two reactance elements substantially in a complex conjugate relation.

These setting conditions are set so as to achieve at least one of (1) obtaining of the maximal gain;
(2) obtaining of the lowest value of the axial ratio, which is 1 or near 1; and
(3) obtaining of the maximal radiation efficiency, for example, at a predetermined operating frequency or a zeroth-order resonance frequency. (1) to (3) will be described in detail later.

Further, the feed line F is a feed line for inputting a signal to a resonator of the non-reciprocal transmission line apparatus 70E in a state where impedance matching can be made by being directly connected to a part or a plurality of sections of the resonator or in a noncontact manner via a capacitive coupling or inductive coupling.

In the present embodiment, in order to satisfy resonance conditions, for example, as the reflectors R1 and R2 for short-circuit, two one-end open lines with finite length are inserted to both ends. The feed line F is directly connected to the reflector R1, one of the reflectors, at a position where matching can be made with the transmission line of 50 ohms. In this case, under the conditions of the two reflectors R1 and R2 at both ends, when a line of a strip conductor 12 at the center related to a series branch and a line of an inductive stub conductor 13 constituting a shunt branch are in an arrangement relation where they are perpendicular to each other, currents flow perpendicularly to each other when the resonance circuit of each branch resonates. That is, the main polarization direction of a radiated wave in a case of parallel resonance in the shunt branch is perpendicular to the main polarization direction of a radiated wave in the case of series resonance in the series branch. In addition, it is known that currents flowing thorough the two resonance circuits have the same phase. In the case where the resonator is made of a linear line, radiated waves form linearly polarized waves even if the radiated waves overlap with each other, and the main polarization direction rotates due to weighing of two currents perpendicular to each other.

Now, for example, it is assumed that the both-ends short-circuited pseudo-travelling wave resonator is formed of a ring structure, and a radiated wave for which contribution of a current flowing through the strip conductor 12 of the series branch is dominant shows circular polarization characteristics. With respect to this, if only the reflectors R1 and R2 at both ends are changed to be open (impedance infinite) without changing the non-reciprocal transmission line apparatus 70E within the resonator, since parallel resonance in a shunt branch is dominant at this time, current distribution concentrates on the inductive stub conductors 13 periodically inserted, and radiated waves from the inductive stub conductors 13 become dominant. At that time, the main polarization direction of the radiated wave is rotated by 90 degrees compared with the case of both-ends short circuit. However, since the radiated wave in the original case of both-ends short circuit shows circular polarization characteristics, the state of circular polarization is maintained even if both ends are changed to the open state with an aim of rotating the main polarization direction by 90 degrees. It can be seen from the above that the result is the same also in the case of inserting two reactive elements in a complex conjugate relation in both ends of the same resonator as the reflectors R1 and R2. Although initial phases may shift from each other, circular polarization characteristics are maintained as they are. Needless to say, by changing the combination of the values of reactive elements in a complex conjugate relation at both ends while satisfying resonance conditions, electric current distribution within the non-reciprocal transmission line apparatus 70E changes, which changes in general the radiation pattern, the gain, the radiation efficiency, and the like.

In the circularly polarized wave antenna apparatus according to the above embodiment, the possible shape of the non-reciprocal transmission line apparatus 70E configuring and operating as a resonator is not limited to a circular shape, and may be each of a square shape, a rectangular shape, and an elliptical shape, or a nonlinear shape such as a split ring shape and a spiral shape. That is, for example, the above each unit cell may be disposed in a single-turn ring shape having a circular, elliptical, square or rectangular shape, a spiral shape with a plurality of turns, or an L-shape. In this case, the non-reciprocal transmission line apparatus 70E constitutes a pseudo-travelling wave resonator. The pseudo-travelling wave resonator includes line part A causing a current to flow in a first direction and radiating an electromagnetic wave polarized in the same direction, and line part B causing a current to flow in a vertical direction (second direction) with respect to the current flowing through line part A and radiating an electromagnetic wave which is polarized in the same direction, and moreover, the phase of which is advanced (or delayed) by 90 degrees than that in line part A.

In the case where the resonator has a circular shape, a square shape, or a shape such as a split ring shape and a spiral shape, and a pair of or a plurality of line parts in which the direction of power transmission is in an anti-parallel direction with respect to propagation of an electromagnetic wave along the line in one direction (for example, forward direction) exist within the same resonator, it is necessary to adjust the phase gradient of the resonator by changing the electrical length of the series branch circuit so that the phase difference between the line parts located at positions opposed to each other across an approximately center part of the above non-reciprocal transmission line apparatus 70E is about 180 degrees. As a result, in the pair of line parts, since the directions of power are opposite to each other and the phase relation is an opposite phase, electromagnetic waves radiated from the two lines coincide with each other in the polarization direction, and moreover, the electromagnetic waves have the same phase. Therefore, the electromagnetic waves strengthen each other by overlapping with each other, and form a radiation beam.

In the case where the resonator has a shape such as a spiral shape, and a pair of or a plurality of line parts in which the direction of power transmission is in a parallel relation with respect to propagation of an electromagnetic wave along the line in one direction (for example, forward direction) exist within the same resonator, it is necessary to adjust the phase gradient of the resonator so that the phase difference between the line parts with a spiral shape adjacent each other is about 0 degrees. As a result, in the line parts, since the directions of power are the same and the phase relation is the same phase, electromagnetic waves radiated from the two lines coincide with each other in the polarization direction, and moreover, the electromagnetic waves have the same phase. Therefore, the electromagnetic waves strengthen each other by overlapping with each other, and form a radiation beam.

In this case, adjustment of the phase gradient can be carried out by changing at least one of the number of unit cells, the magnitude of magnetization M, and the electrical length of the stub conductor 13 of the shunt branch.

The operating point of the non-reciprocal transmission line apparatus 70E used for the circularly polarized wave antenna apparatus is targeted at not only a case of a fast-wave region, that is a leaky wave radiation region but a case of a non-radiated region.

In addition, in the case where non-reciprocity of the non-reciprocal transmission line apparatus 70E is relatively small and the operating point of the line is in the radiation region, leaky wave radiation from the non-reciprocal transmission line apparatus 70E forms a radiation beam. At that time, the non-reciprocal transmission line apparatus 70E operates as a highly effective leaky wave antenna using multiple reflection at both ends of the resonator. In this case, it is possible to increase the directional pattern and radiation gain of a beam formed in the broadside direction along with an increase in the antenna size.

In this case, in the case where non-reciprocity of the non-reciprocal transmission line apparatus 70E is great and the operating point is in the non-radiation region, since leaky wave radiation from the non-reciprocal transmission line apparatus 70E does not occur, propagation loss greatly reduces. As a result, a Q factor of the pseudo-travelling wave resonator rises and an operating bandwidth lowers. In this case, there is an advantageous feature that the antenna size may be made more compact in comparison with the case of a leaky wave since the phase constant of the line becomes great. On the other hand, the directional pattern becomes smaller. In addition, the rotation direction of polarization (right-hand circular polarization or left-hand circular polarization) is determined according to the direction of the phase gradient due to non-reciprocity of the non-reciprocal transmission line apparatus 70E. Further, an exemplary method for switching over the polarization rotation direction is reversing the direction of the externally applied magnetic field applied to the ferrite plate 15 included in the line without changing the size the externally applied magnetic field.

5. Numerical Simulation

FIGS. 14A and 14B are graphs showing simulation results of the non-reciprocal transmission line apparatus 70E used in the circularly polarized wave antenna apparatus of FIGS. 13A and 13B. FIG. 14A is a graph showing frequency characteristics of S parameters. FIG. 14B is a graph showing dispersion characteristics.

The present inventors et al. examined the circularly polarized wave antenna apparatus having the non-reciprocal circular structure of FIGS. 13A and 13B using numerical FEM simulation in HFSS (registered trademark) software manufactured by Ansoft Corporation. The apparatus was modeled using a YIG ferrite plate 15 with a diameter of 54 mm and a thickness of 0.8 mm. Microstrip lines each having a strip conductor 12 with a width of 1 mm are formed on the circumferential edge part of the ferrite plate 15 at intervals of 4 mm. A capacitor Cse of 0.2 pF is inserted between unit cells, which provides negative permeability μ characteristics in the apparatus. In each unit cell, a shunt branch stub conductor 13 having a length of 1 mm and a width of 1 mm is asymmetrically loaded, the strip conductor 12, which is a transmission line part of each unit cell is formed on a ferrite plate 15, and the stub conductor 13 of each unit cell is formed on a dielectric substrate 10 having dielectric constant $\varepsilon_{st}$=2.6 and a thickness of 0.8 mm. A circular shielding metal plate with a diameter of 41 mm is attached on an upper surface of the ferrite plate 15, and here, a gap of 4 mm is formed between the shielding metal plate and the non-reciprocal transmission line apparatus 70E. Two reflectors R1 and R2 having line widths of 0.8 mm are connected to ports P1 and P2 at both ends of the non-reciprocal transmission line apparatus 70E configuring a metamaterial resonator. The reflector R2, one of the reflectors, has a length of 2.2 mm, and the other reflector R1 has a length of 22 mm. Power is fed to the non-reciprocal transmission line apparatus 70E via the reflector R1 using a feed line F having a microstrip line of 50Ω.

First, simulation was done for a semicircular part of the non-reciprocal transmission line apparatus 70E constituted of 22 unit cells. FIG. 14A shows a relatively low insertion loss of 0.1 dB per unit cell. Most of the insertion loss contributes to radiation. When the ferrite plate 15 saturated at 4 πMs=1750 G is used, the non-reciprocal transmission line apparatus 70E shows the magnitude of non-reciprocity greater than phase constant Δβ=0.75 rad/cm in FIG. 14B. This magnitude is sufficiently greater than the magnitude for achieving phase-shift of 2π in a circular structure.

Next, simulation was done for the resonator characteristic of the non-reciprocal transmission line apparatus 70E when the ferrite plate 15 is magnetized up to 4 πM=860 G.

Figure 15A:
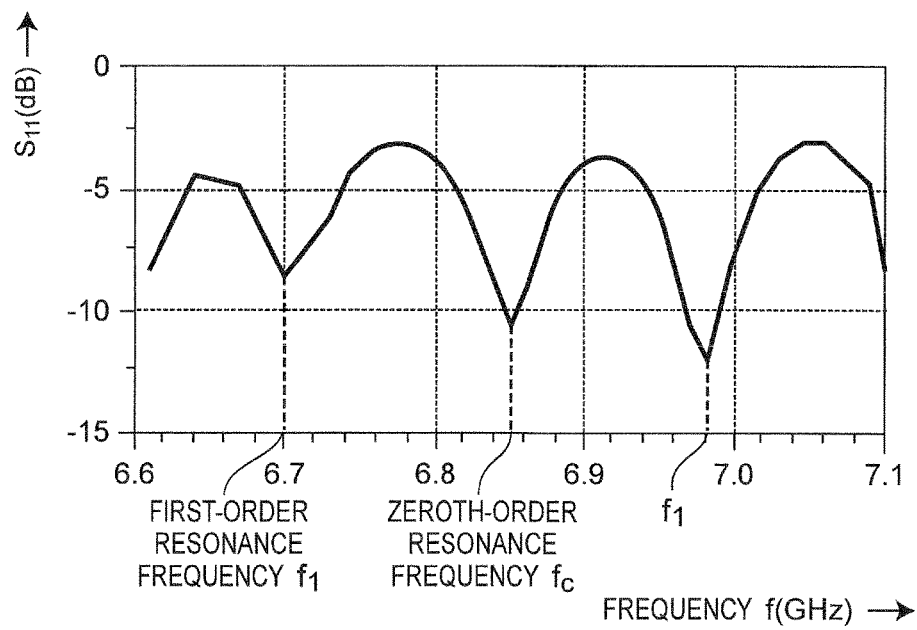
FIG. 15A is a graph showing simulation results of the circularly polarized wave antenna apparatus of FIGS. 13A and 13B, and showing reflection characteristics.
Figure 15B:
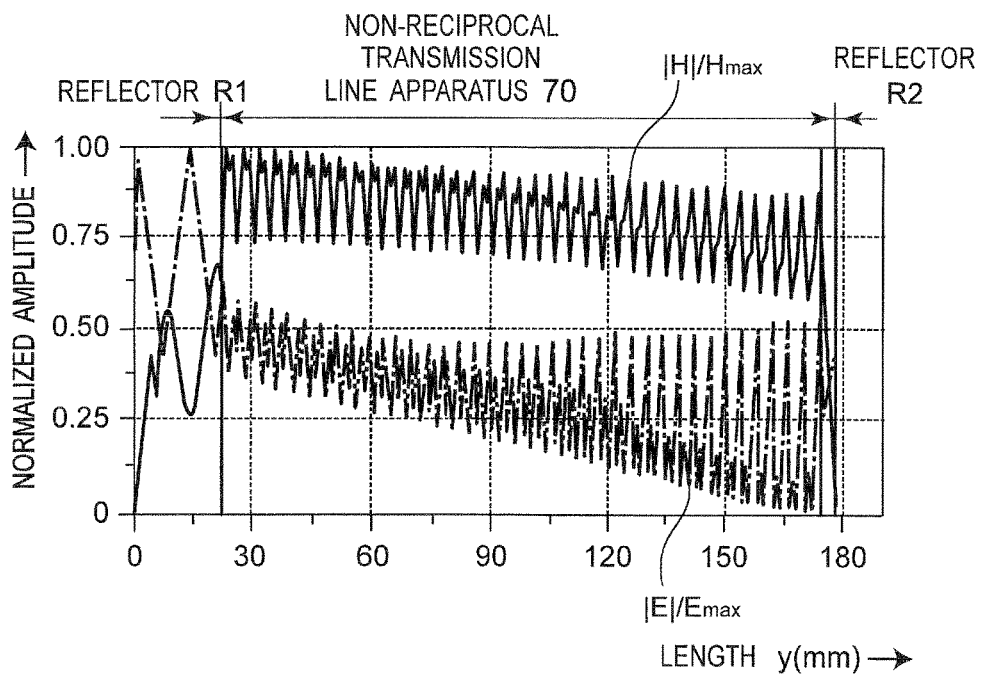
FIG. 15B is a graph showing simulation results of the circularly polarized wave antenna apparatus of FIGS. 13A and 13B, and showing a normalized magnetic field distribution and a normalized electric field distribution along the longitudinal direction of the non-reciprocal transmission line apparatus 70E including two reflectors R1 and R2 at a frequency of 6.85 GHz.
Figure 15C:
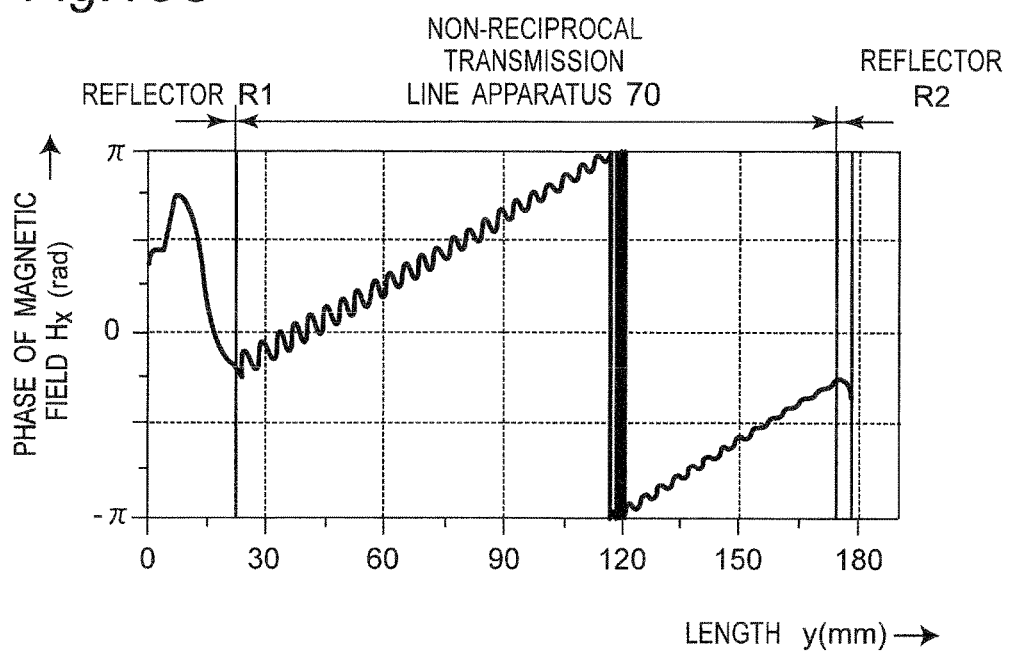
FIG. 15C is a graph showing simulation results of the circularly polarized wave antenna apparatus of FIGS. 13A and 13B, and showing a phase distribution of magnetic field Hx along the longitudinal direction of the non-reciprocal transmission line apparatus 70E including the two reflectors R1 and R2 at the frequency of 6.85 GHz.

FIGS. 15A, 15B, and 15C show simulation results of the circularly polarized wave antenna apparatus of FIGS. 13A and 13B, and FIG. 15A is a graph showing reflection characteristics. In addition, FIG. 15B is a graph showing a normalized magnetic field distribution and a normalized electric field distribution along the longitudinal direction of the non-reciprocal transmission line apparatus 70E including the two reflectors R1 and R2 at a frequency of 6.85 GHz. Further, FIG. 15C is a graph showing a phase distribution of magnetic field Hx along the longitudinal direction of the non-reciprocal transmission line apparatus 70E including the two reflectors R1 and R2 at the frequency of 6.85 GHz.

FIG. 15A shows the frequency characteristics of $S_{11}$ showing zeroth-order resonance and first-order resonance. The minimal value of the input reflection attenuation amount (loss) of FIG. 15A in zeroth-order resonance is obtained at 6.85 GHz. Minimal values due to two half-wave resonances were observed in higher and lower bands. The order of the resonance was confirmed from the fact that amplitude distribution of magnetic field H along the non-reciprocal transmission line apparatus 70E of FIG. 15B at 6.85 GHz is even. The constant gradient discovered in the phase distribution diagram of FIG. 15C shows that pseudo-travelling wave resonance actually occurs at this frequency. Even in a case of a resonator using ferrite having relatively low magnetization, it is important in terms of practical use that phase-shift of 2π is achieved.

Figure 16A:
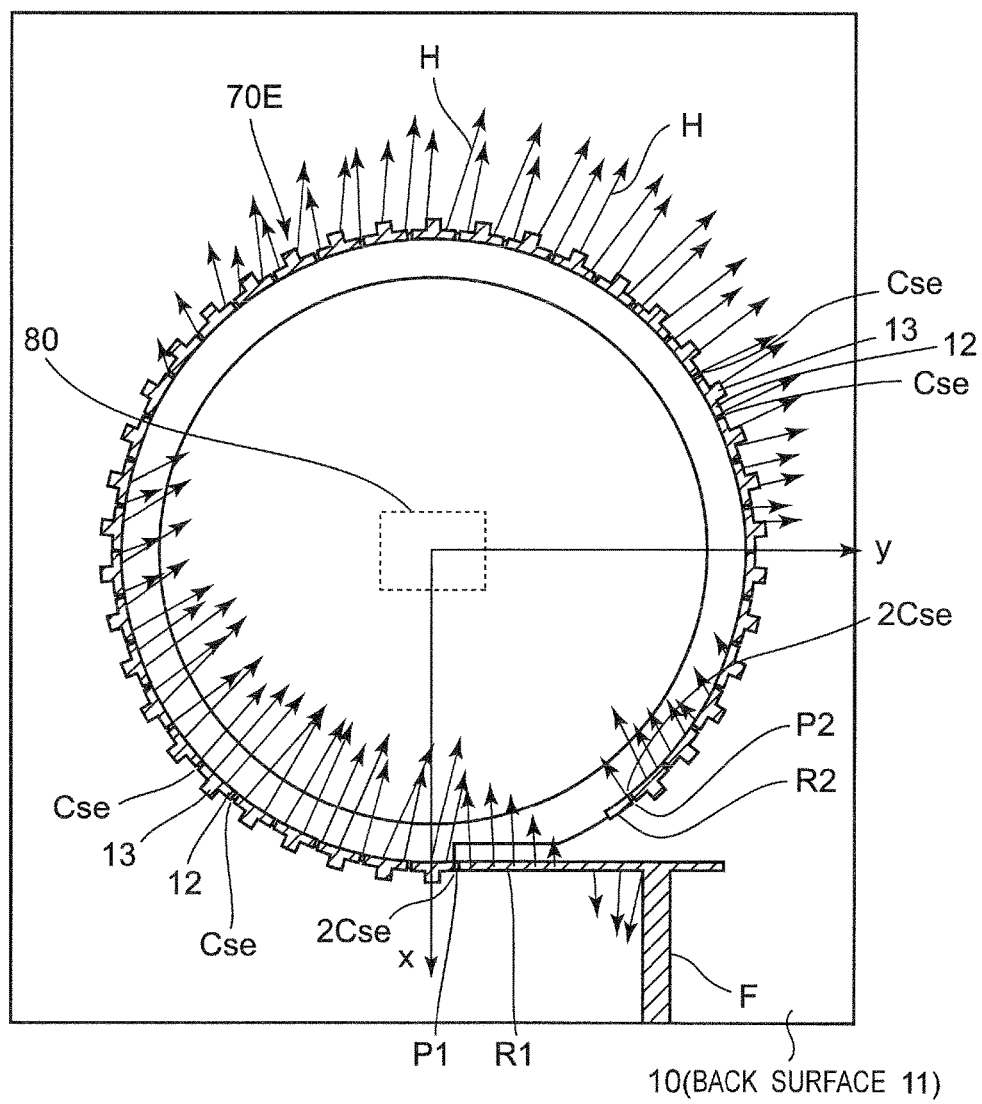
FIG. 16A is a plan view showing simulation results of the circularly polarized wave antenna apparatus of FIGS. 13A and 13B, and showing a distribution of magnetic field vectors H on an antenna plane.
Figure 16B:
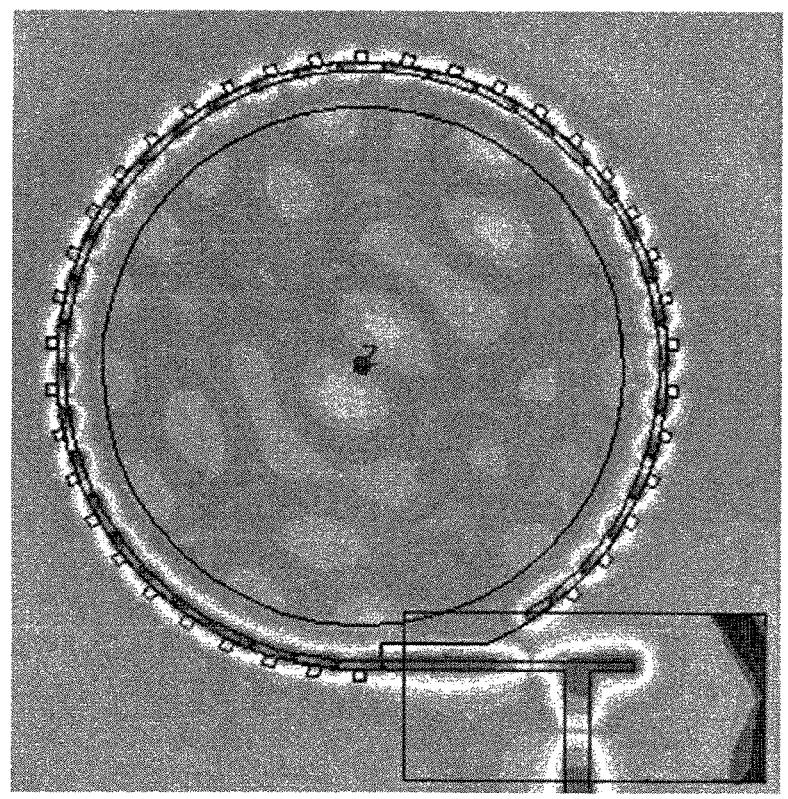
FIG. 16B is a photograph showing simulation results of the circularly polarized wave antenna apparatus of FIGS. 13A and 13B, and showing an electric field distribution on the antenna plane.
Figure 16C:
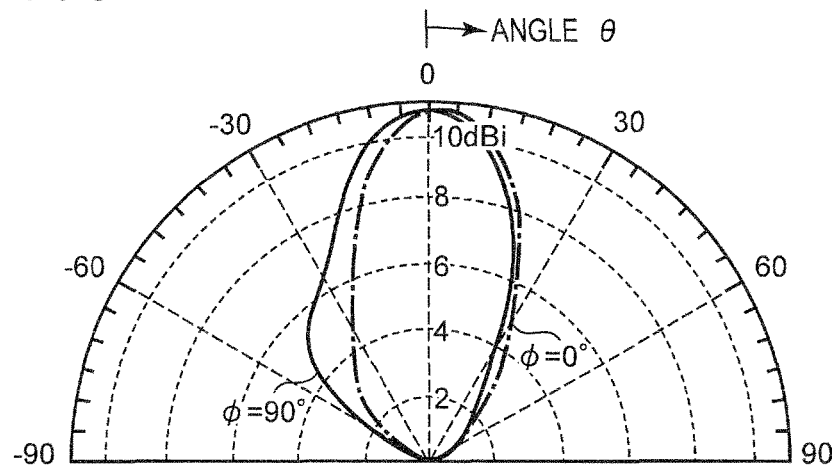
FIG. 16C is a radiation pattern diagram showing simulation results of the circularly polarized wave antenna apparatus of FIGS. 13A and 13B, and showing a radiation characteristic on a plane perpendicular to the antenna plane.
Figure 16D:
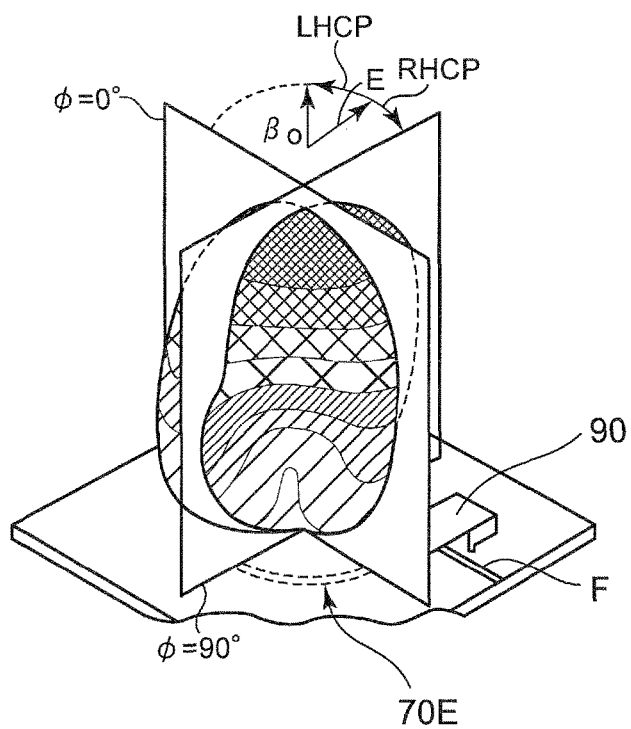
FIG. 16D is a perspective view showing simulation results of the circularly polarized wave antenna apparatus of FIGS. 13A and 13B, and a radiation pattern including two planes ($\phi$=0.90 degrees) vertical to the antenna plane.

FIGS. 16A to 16D show simulation results of the circularly polarized wave antenna apparatus of FIGS. 13A and 13B. FIG. 16A is a plan view showing distribution of magnetic field vectors H on an antenna plane. FIG. 16B is a photograph showing an electric field distribution on the antenna plane. FIG. 16C is a radiation pattern diagram showing radiation characteristics on a plane vertical to the antenna plane. FIG. 16D is a perspective view showing a radiation pattern including two planes (φ=0.90 degrees) vertical to the antenna plane. In FIG. 16D, the higher the density of hatching is, the greater the electric field is. FIG. 16D shows a three-dimensional radiation pattern showing a cross section in radiation pattern characteristics, and rotation of electric field vector E of a beam in a broadside direction is observed. Note that in the photograph of FIG. 16B, a dense part indicates that the electric field is relatively great, and on the other hand, a pale part indicates that the electric field is relatively small. In addition, measurement conditions in FIG. 16C are frequency=6.85 GHz, magnetization 4 πM=858 G, half-value width ΔH of magnetic field is 40 Oe. Further, in FIG. 16D, 90 denotes a metal shielding plate.

The above predication that the electromagnetic field uniformly rotates can be confirmed from the electromagnetic field distribution obtained from simulation. Magnetic field vectors H are generated by a metamaterial transmission line of the antenna, and are illustrated by using the plurality of vectors of FIG. 16A. In this case, a plurality of nearly uniform points in one direction determine a cross-polarization plane. Although whether or not distribution of rotating magnetic field vectors H shows uniformity of the amplitude cannot be judged, it is possible to confirm uniformity of the electric field in the circularly polarized wave antenna apparatus from the characteristic diagram of electric field component Ez of FIG. 16B. From the radiation pattern of FIG. 16C, it is possible to confirm that narrow beam radiation with gain of about 11 dBi. A side lobe observed on the plane with φ=90° appears since the circular structure is a split ring. The gap between the end part ports P1 and P2 of the non-reciprocal transmission line apparatus 70E causes disturbance to the electromagnetic field distribution. In the simulation results, electromagnetic field radiation shows nearly complete circular polarization characteristics. In addition, depending on the applied DC magnetic field, the circularly polarized wave antenna apparatus operates as a non-reciprocal left-handed transmission line antenna at magnetization M parallel to z direction, and operates as a non-reciprocal right-handed transmission line antenna at magnetization M parallel to −z direction, opposite to z direction.

6. Prototyped Circularly Polarized Wave Antenna Apparatus

The present inventors prototyped a circularly polarized wave antenna apparatus and conducted experiments and simulation, which will be described below.

Figure 17A:
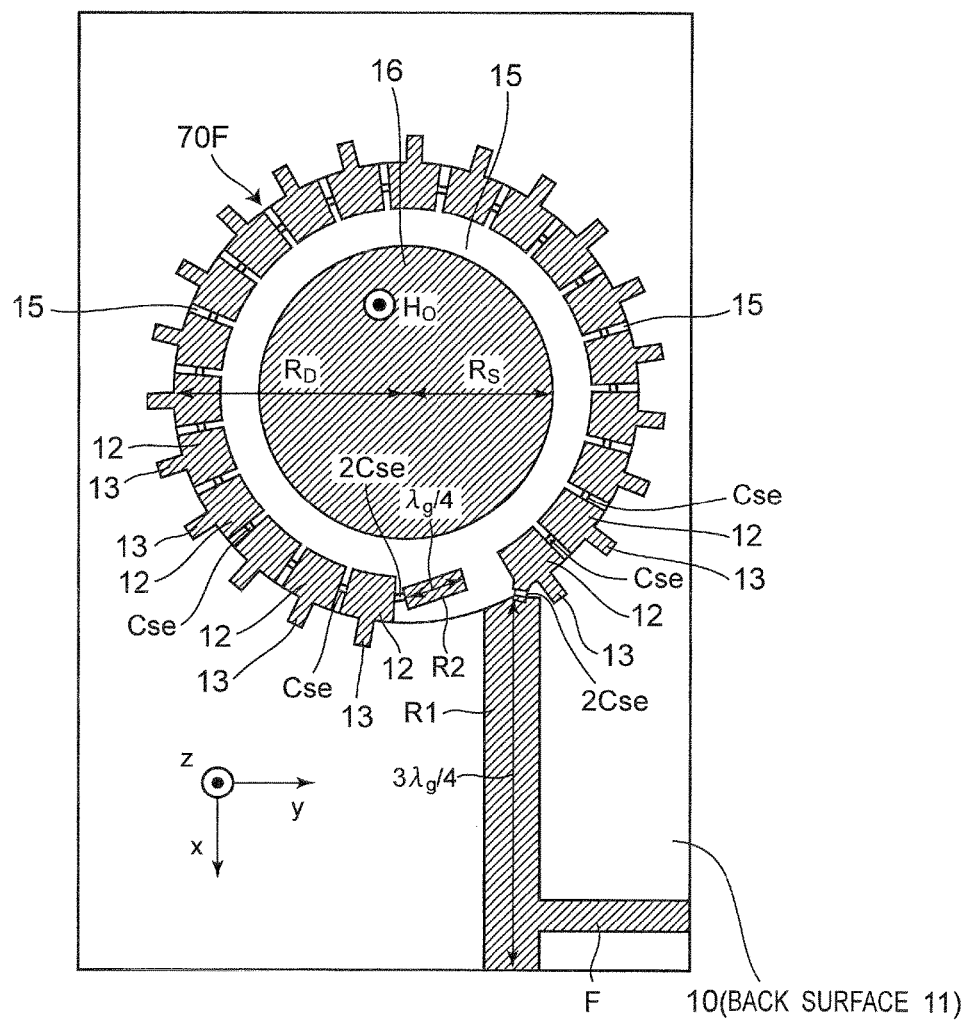
FIG. 17A is a plan view showing a configuration of a circularly polarized wave antenna apparatus using a non-reciprocal transmission line 70F according to an embodiment of the present invention.
Figure 17B:
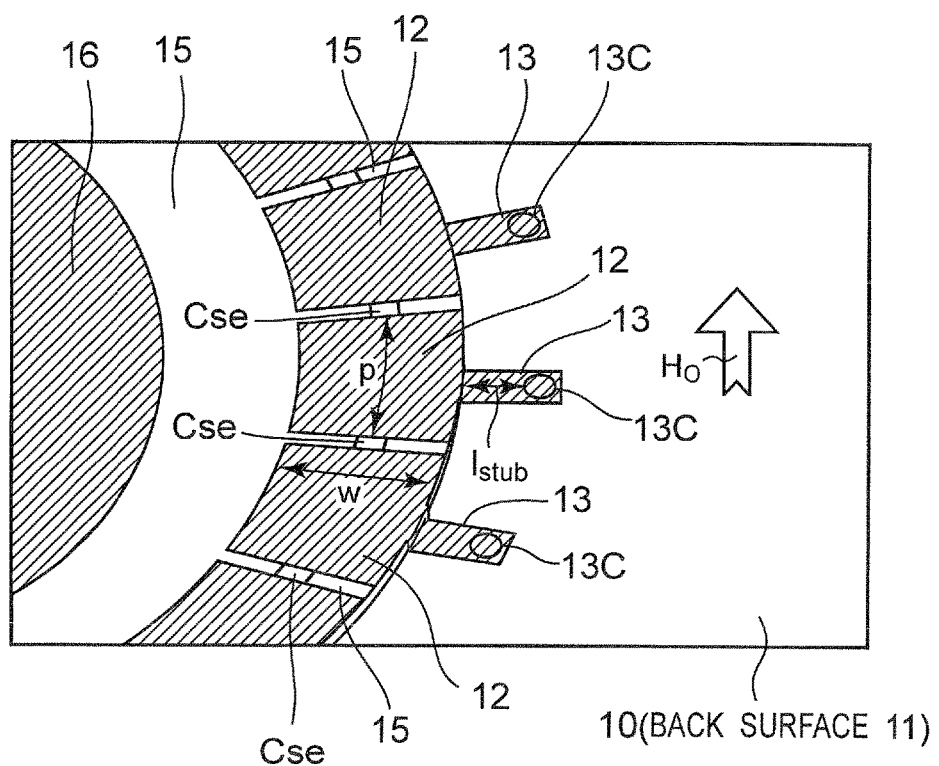
FIG. 17B is an enlarged perspective view showing a partial configuration of FIG. 17A.

FIG. 17A is a plan view showing a configuration of a circularly polarized wave antenna apparatus using a non-reciprocal transmission line apparatus 70F according to an embodiment of the present invention. In addition, FIG. 17B is an enlarged perspective view showing a partial configuration of FIG. 17A.

In FIG. 17A, an yttrium-iron-garnet (YIG) polycrystalline circular ferrite plate 15 with a thickness of 1.0 mm and a diameter of 32.0 mm is placed on the center of a ground conductor 11. Further, the non-reciprocal transmission line apparatus 70F, which is a composite right/left-handed line constituted of a circular microstrip line, is configured on the edge of the upper surface of the ferrite plate 15. On the ground conductor 11 and the outside the ferrite plate 15, a dielectric substrate 10 with a thickness of 0.8 mm is placed. Shunt branch short-circuited stub conductors 13 periodically inserted in a circular line so that effective dielectric constant of the structure becomes negative are formed on the dielectric substrate 10. In this case, each stub conductor 13 is short-circuited by being connected to the ground conductor 11 via a via conductor 13C.

Parameters of the prototyped non-reciprocal transmission line apparatus 70F, which is a composite right/left-handed line, are as follows. Relative dielectric constant $\varepsilon_f$ of the ferrite plate 15 is 15. Relative dielectric constant $\varepsilon_d$ of the dielectric substrate 10 is 2.6, and a fluororesin multilayer ubstrate (manufactured by Nippon Pillar Packing CO. LTD, NPC-F260A) is used as the dielectric substrate 10. Strip width w of the microstrip line of the non-reciprocal transmission line apparatus 70F at the center is 3.0 mm, and size p of the unit cell is 3.0 mm. The length and width of the stub conductor 13 are 1.3 mm and 1.0 mm, respectively. When configuring the antenna apparatus, the number of unit cells configuring the resonator is set to 21.

Next, the propagation characteristic of the non-reciprocal transmission line apparatus 70F of FIG. 17A will be described below.

Figure 18:
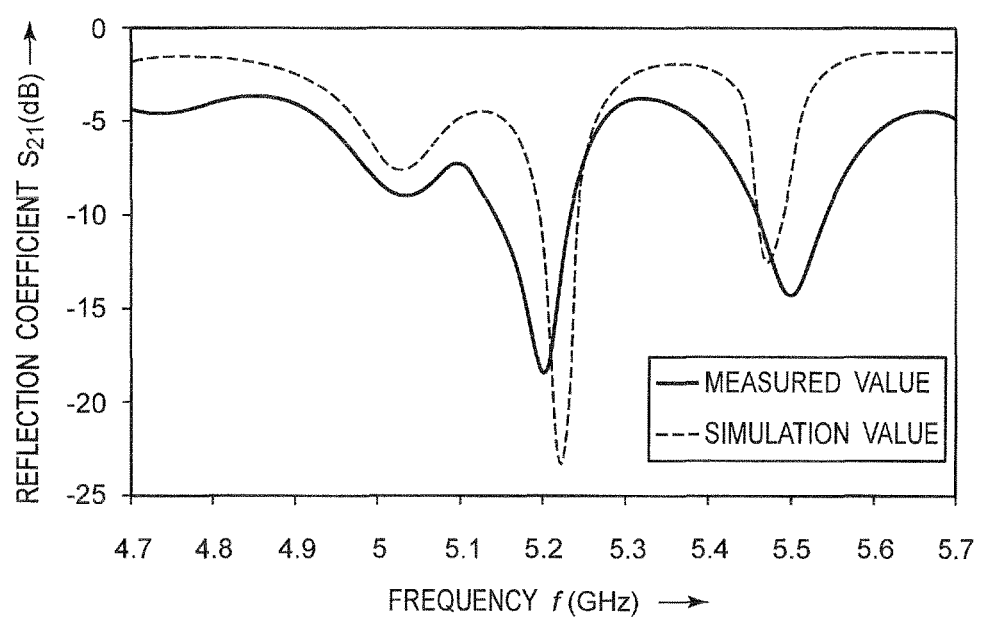
FIG. 18 is a graph showing a reflection characteristic of the circularly polarized wave antenna apparatus of FIG. 17A.

FIG. 18 is a graph showing the reflection characteristic of the circularly polarized wave antenna apparatus of FIG. 17A. Since effective magnetization of YIG, which is soft magnetic material, is nearly 0 in the case of not applying a magnetic field thereto, it is possible to treat YIG as an isotropic dielectric. At that time, the composite right/left-handed line of the non-reciprocal transmission line apparatus 70F shows reciprocity. In zeroth-order resonance, both the magnitude and the phase of the electromagnetic field distribution on the line are uniform. FIG. 18 shows the reflection characteristic of the antenna apparatus measured in a feed line F at that time. Note that FIG. 18 shows not only the measurement results but also the numerical calculation results of simulation for the purpose of comparison. It is confirmed from the results of numerical simulation of the electromagnetic field distribution that zeroth-order resonance characteristics appear at a frequency of 5.0 GHz.

Figure 19:
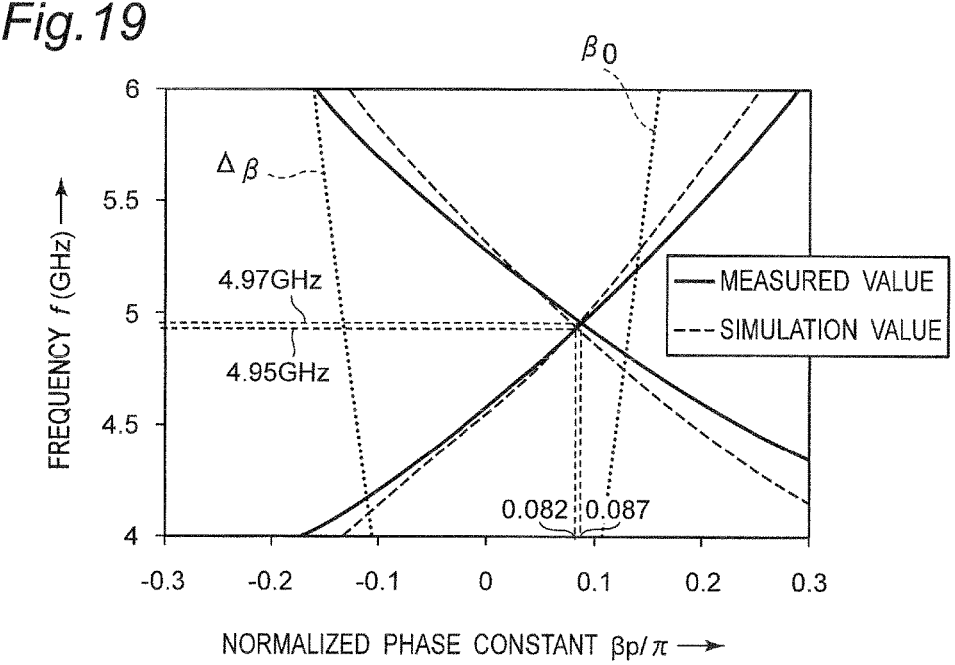
FIG. 19 is a graph showing a first example of a dispersion characteristic of the non-reciprocal transmission line apparatus 70F of FIG. 17A.
Figure 20:
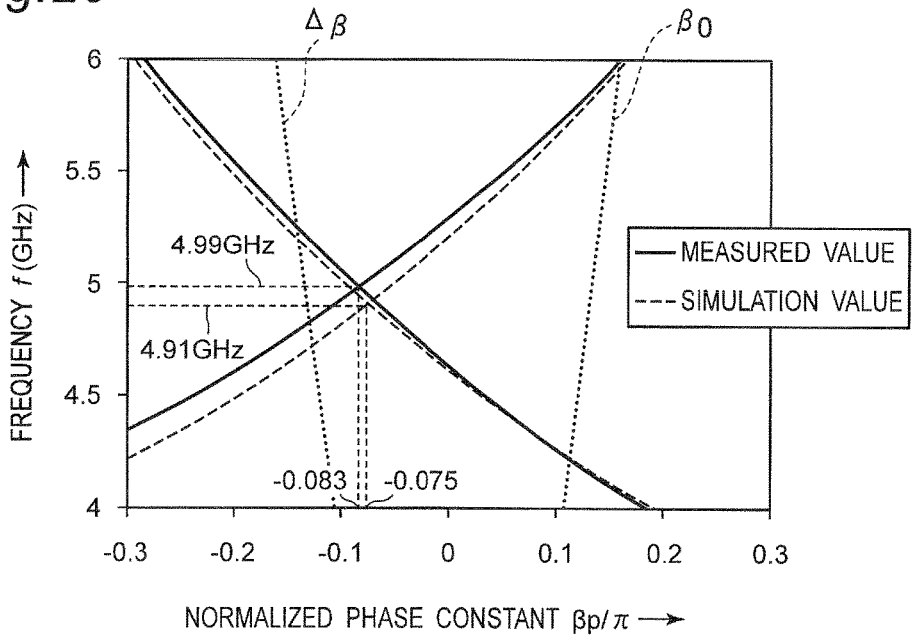
FIG. 20 is a graph showing a second example of the dispersion characteristic of the non-reciprocal transmission line apparatus 70F of FIG. 17A.

FIG. 19 is a graph showing a first example of the dispersion characteristic of the non-reciprocal transmission line apparatus 70E of FIG. 17A. In addition, FIG. 20 is a graph showing a second example of the dispersion characteristic of the non-reciprocal transmission line apparatus 70E of FIG. 17A. In this case, FIG. 19 shows a dispersion characteristic of the composite right/left-handed transmission line of the designed and prototyped non-reciprocal transmission line apparatus 70E. FIG. 19 shows the case of effective magnetization $\mu_0 Ms=+110$ mT as the numerical calculation of simulation, and shows the dispersion characteristic in the case of externally applied magnetic field $\mu_0 Hext=+95$ mT as the experimental results. In addition, FIG. 20 shows the case where a magnetic field is applied in the direction opposite to that in the case of FIG. 19, and shows the dispersion curves of the case of effective magnetization $\mu_0 Ms=-110$ mT as the numerical calculation of simulation, and shows the dispersion curves of the case of externally applied magnetic field $\mu_0 Hext=-95$ mT as the experimental results.

Figure 21:
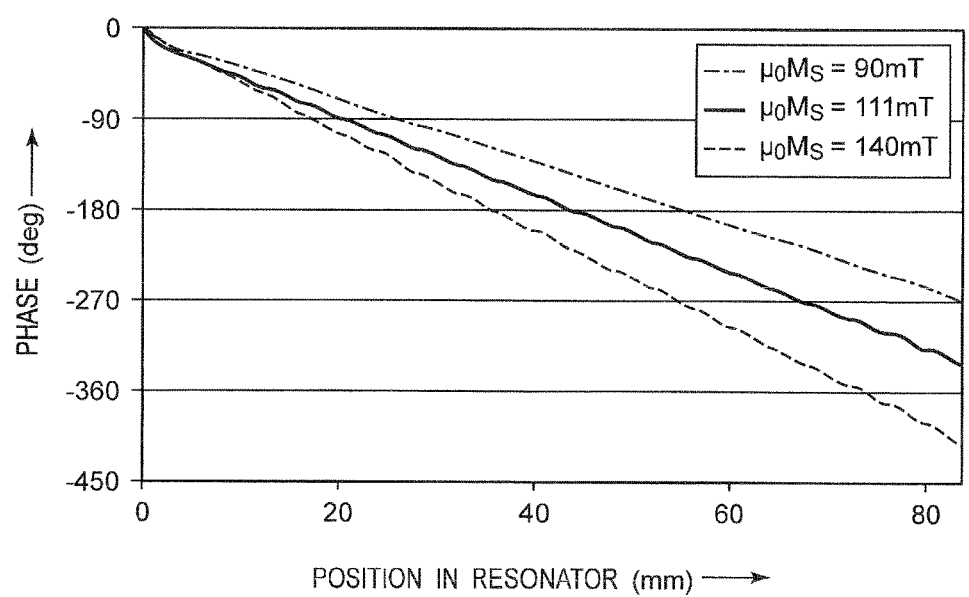
FIG. 21 is a graph showing a phase of an electromagnetic field as a function of a position in a resonator in the circularly polarized wave antenna apparatus of FIG. 17A.

FIG. 21 is a graph showing a phase of an electromagnetic field as a function of a position in a resonator in the circularly polarized wave antenna apparatus of FIG. 17A. With reference to FIG. 21, the reason why the case of effective magnetization $\mu_0 Ms=110$ mT is selected as the numerical calculation results in FIG. 19 will be described. FIG. 21 shows a phase distribution of the electromagnetic field observed along the longitudinal direction of the non-reciprocal transmission line apparatus 70F, which is a ring-shaped composite right/left-handed line. It is known that an electromagnetic wave radiated from the line shows circular polarization characteristics, when the phase difference of a travelling wave that propagates along the longitudinal direction of the ring-shaped line and makes a round of the ring-shaped line is 360 degrees. From FIG. 21, it can be confirmed that the phase difference by the amount of one round of the ring along the composite right/left-handed line in the case of effective magnetization $\mu_0 Ms=110$ mT corresponds to nearly 360 degrees. In addition, as described later, also from other numerical calculation results with respect to the radiation characteristic of the resonance antenna apparatus shown in FIG. 17A, it is confirmed that right circular polarization radiation characteristics appear in the case where effective magnetization $\mu_0 Ms$ of the line is 110 mT.

The case where the externally applied magnetic field is 95 mT is selected as the experimental results in FIG. 19 because non-reciprocity in the vicinity of the intersection of the two dispersions curves is nearly the same as that in the case of effective magnetization $\mu_0 Ms=110$ mT capable of obtaining a circularly polarized wave. The same applies to the case of FIG. 20.

Next, the reflection characteristic of the non-reciprocal transmission line apparatus 70F of FIG. 17A will be described below.

Figure 22:
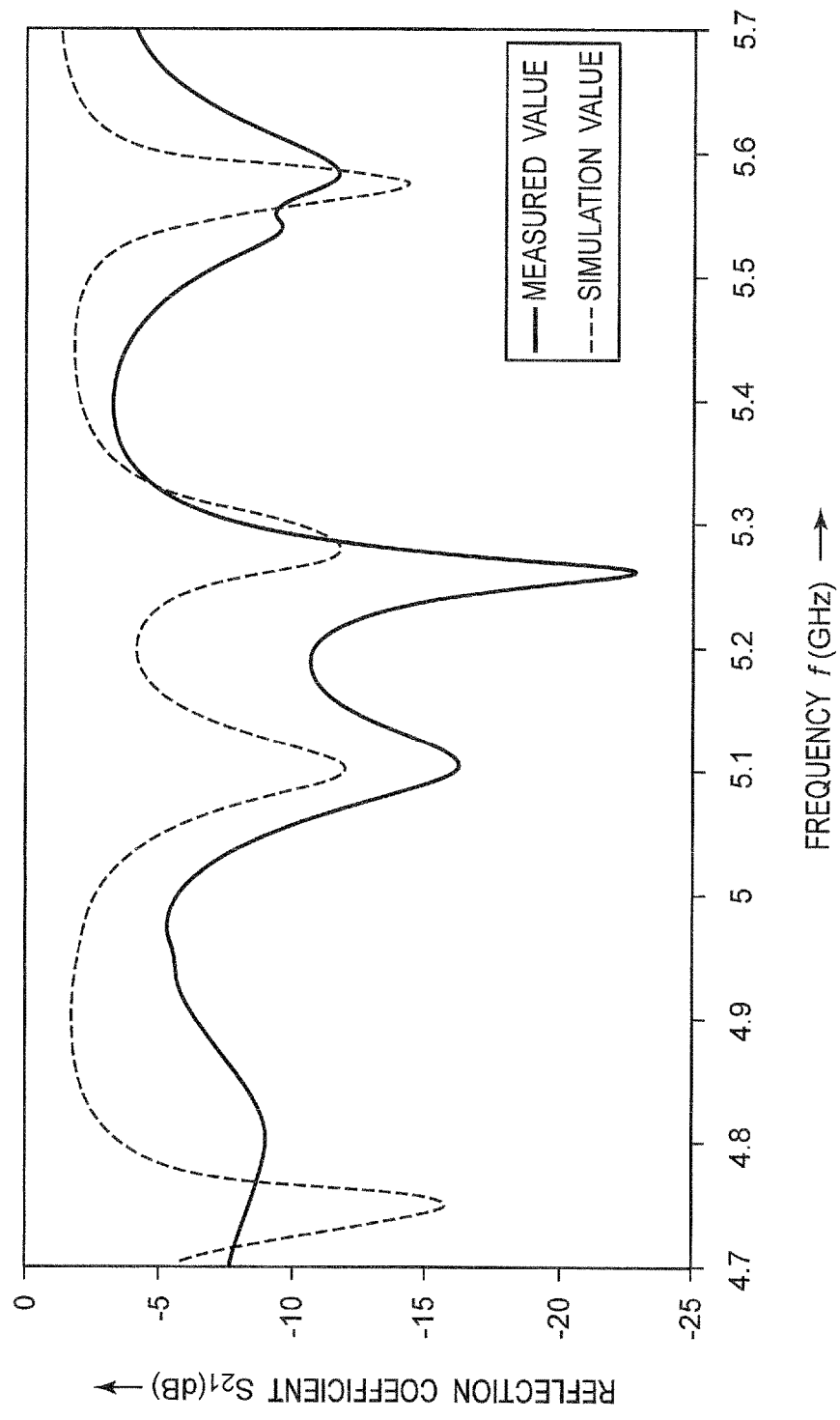
FIG. 22 is a graph showing a first example of a reflection characteristic of the circularly polarized wave antenna apparatus of FIG. 17A.
Figure 23:
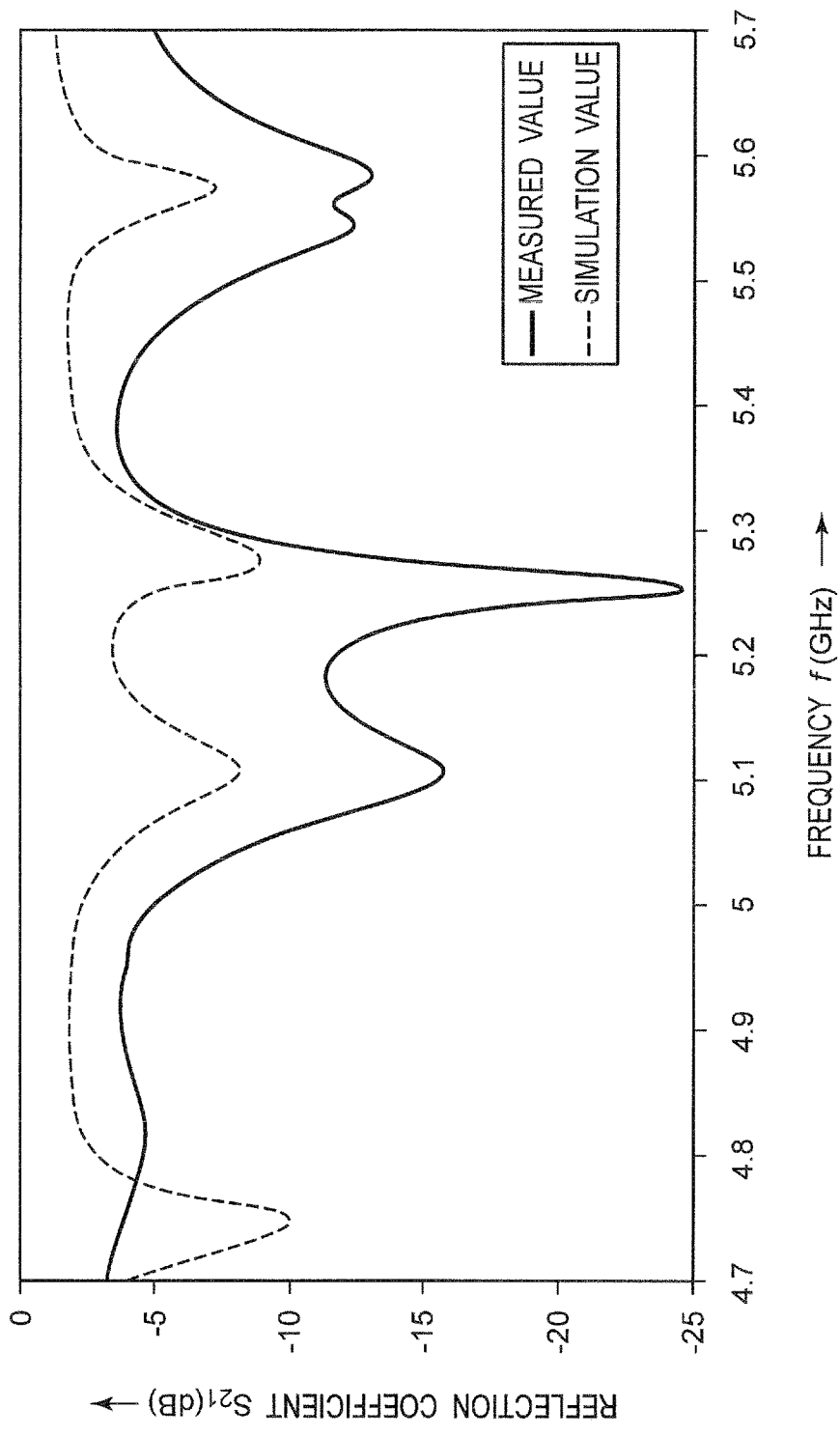
FIG. 23 is a graph showing a second example of the reflection characteristic of the circularly polarized wave antenna apparatus of FIG. 17A.

FIG. 22 is a graph showing a first example of the reflection characteristic of the circularly polarized wave antenna apparatus of FIG. 17A. In addition, FIG. 23 is a graph showing a second example of the reflection characteristic of the circularly polarized wave antenna apparatus of FIG. 17A.

FIG. 22 shows the calculation results of the reflection characteristics seen from the feed line F in the case of effective magnetization $\mu_0 Ms=110$ mT in the antenna structure of FIG. 17A. By giving effective magnetization, the operating frequency of pseudo-travelling wave resonance is shifted to 5.1 GHz from 5.0 GHz, which is the zeroth-order resonance frequency in the case where the magnetic field of FIG. 18 is not applied. By actually observing the electromagnetic field distribution on the line obtained from the calculation results, it has been confirmed that the amplitude distribution is uniform and the phase gradient is constant.

FIG. 22 shows reflection characteristics in the case of externally applied magnetic field $\mu_0 Hext=95$ mT as the measurement results. The magnitude of the externally applied magnetic field is a value obtained by adjusting the external magnetic field during measurement so that the operating frequency matches the resonance frequency in the case of effective magnetization $\mu_0 Ms=110$ mT, the numerical calculation results. The value turns out to match the value in the case of FIG. 19. FIG. 23 shows reflection characteristics from the feed line in the case where a DC magnetic field is applied in the direction opposite to the direction in FIG. 22. FIG. 23 shows the case of effective magnetization $\mu_0 Ms=-110$ mT as the numerical calculation, and shows the case of externally applied magnetic field $\mu_0 Hext=-95$ mT as the experimental results. In a manner similar to that of FIG. 22, this case is also the result obtained though adjustment made so as to make the operating frequency nearly match the numerical calculation during measurement of reflection characteristics.

Next, the radiation characteristic of the circularly polarized wave antenna apparatus of FIG. 17A will be described below.

Figure 24A:
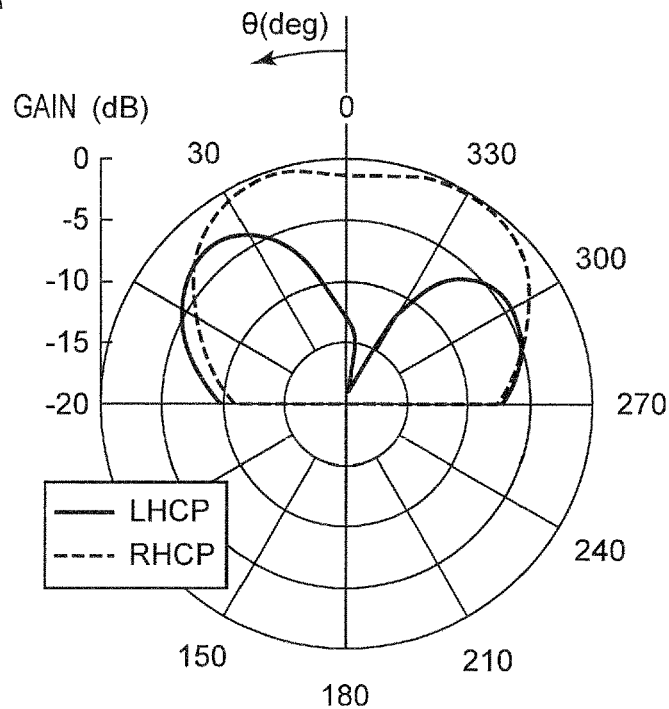
FIG. 24A is a radiation pattern diagram showing a first example of a radiation characteristic of the circularly polarized wave antenna apparatus of FIG. 17A.
Figure 24B:
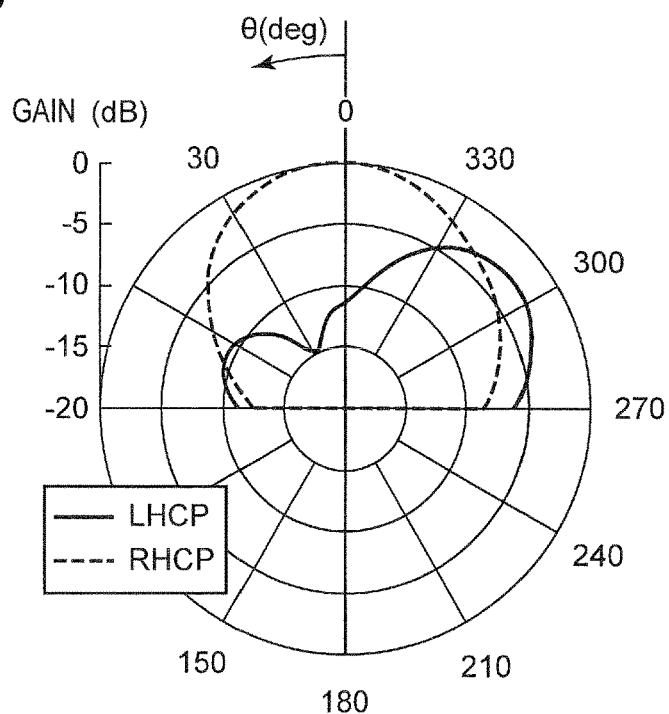
FIG. 24B is a radiation pattern diagram showing a second example of the radiation characteristic of the circularly polarized wave antenna apparatus of FIG. 17A.
Figure 24C:
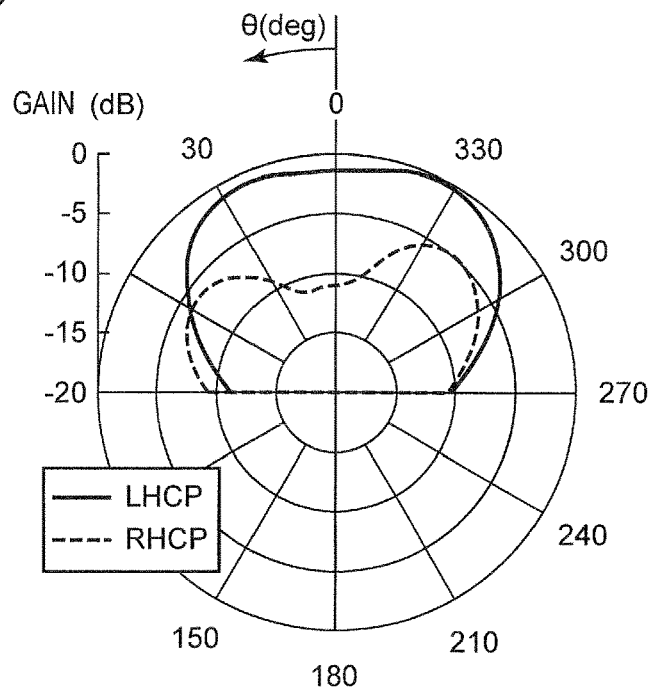
FIG. 24C is a radiation pattern diagram showing a third example of the radiation characteristic of the circularly polarized wave antenna apparatus of FIG. 17A.
Figure 24D:
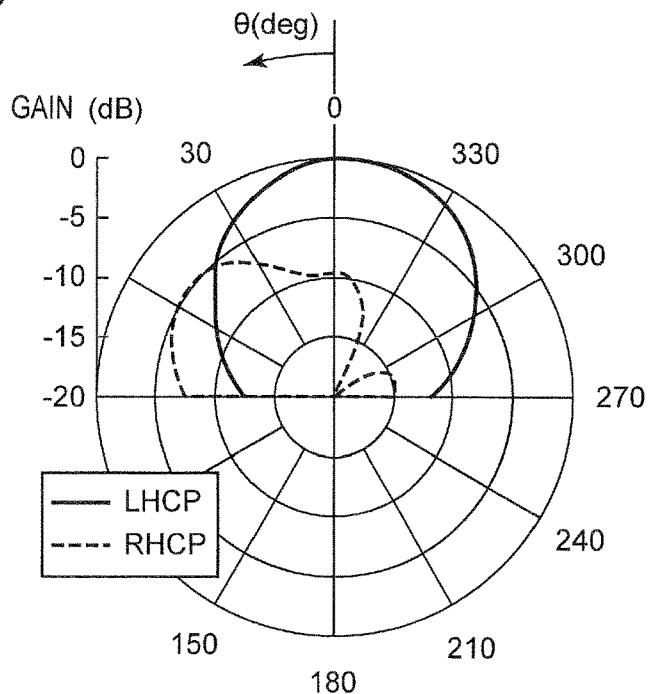
FIG. 24D is a radiation pattern diagram showing a fourth example of the radiation characteristic of the circularly polarized wave antenna apparatus of FIG. 17A.

FIGS. 24A, 24B, 24C, and 24D are radiation pattern diagrams showing first to fourth examples of the radiation characteristic of the circularly polarized wave antenna apparatus of FIG. 17A, respectively. In this case, FIGS. 24A and 24B show the cases of effective magnetization $\mu_0 Ms=110$ mT. FIGS. 24C and 24D show the cases of effective magnetization $\mu_0 Ms=-110$ mT. FIGS. 24A and 24C show radiation patterns of an xz plane. FIGS. 24B and 24D show radiation patterns of an yz plane. It can be seen from FIGS. 24A and 24B that a right circularly polarized radiation beam is formed in the broadside direction in the case of positive effective magnetization. It can be seen from FIGS. 24C and 24D that a left circularly polarized radiation beam is formed in the broadside direction in the case of negative effective magnetization. Thus, it can be seen that the rotation direction of a circularly polarized wave is switched over by switching over the magnetization direction.

Figure 25A:
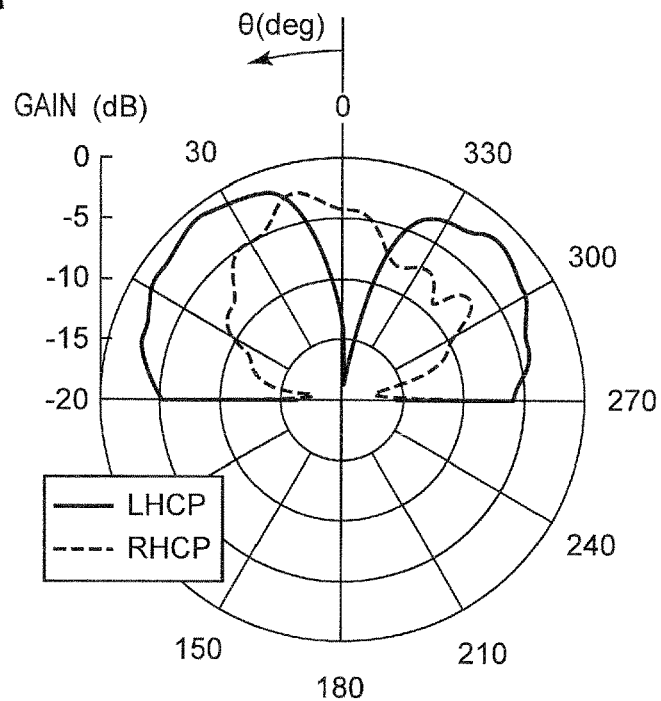
FIG. 25A is a radiation pattern diagram showing a fifth example of the radiation characteristic of the circularly polarized wave antenna apparatus of FIG. 17A.
Figure 25B:
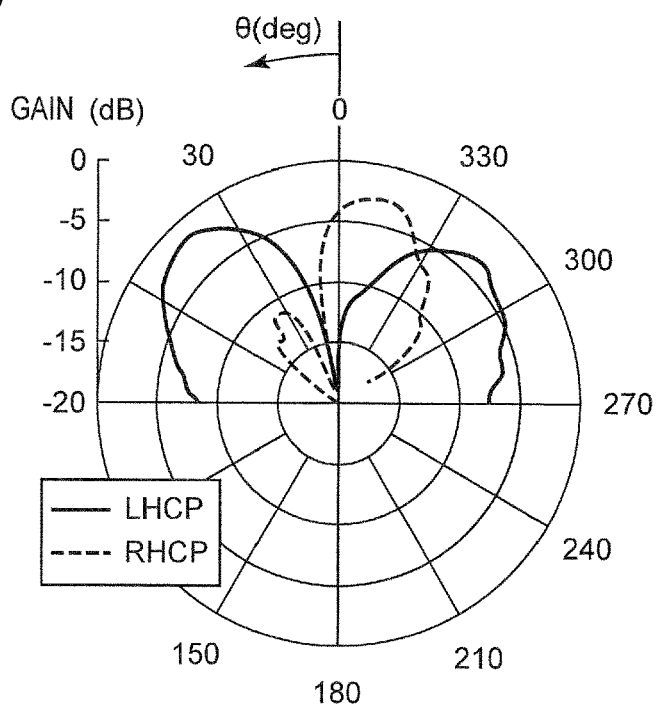
FIG. 25B is a radiation pattern diagram showing a sixth example of the radiation characteristic of the circularly polarized wave antenna apparatus of FIG. 17A.
Figure 25C:
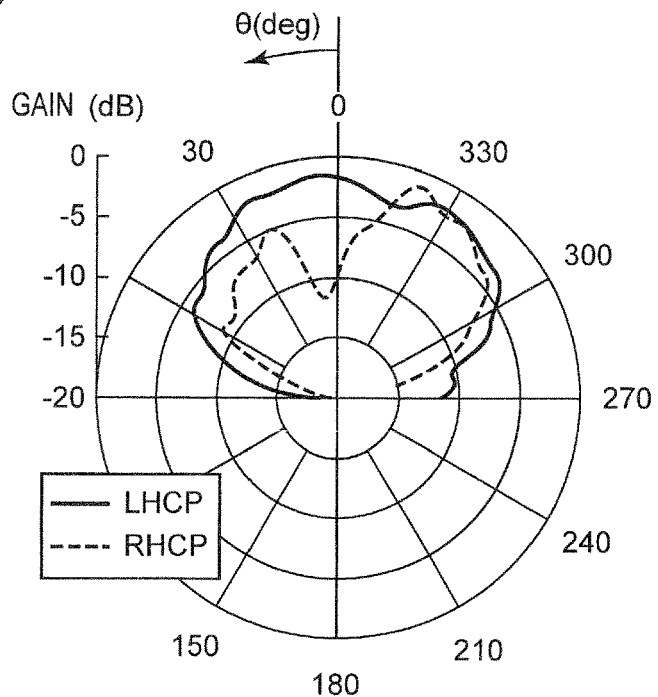
FIG. 25C is a radiation pattern diagram showing a seventh example of the radiation characteristic of the circularly polarized wave antenna apparatus of FIG. 17A.
Figure 25D:
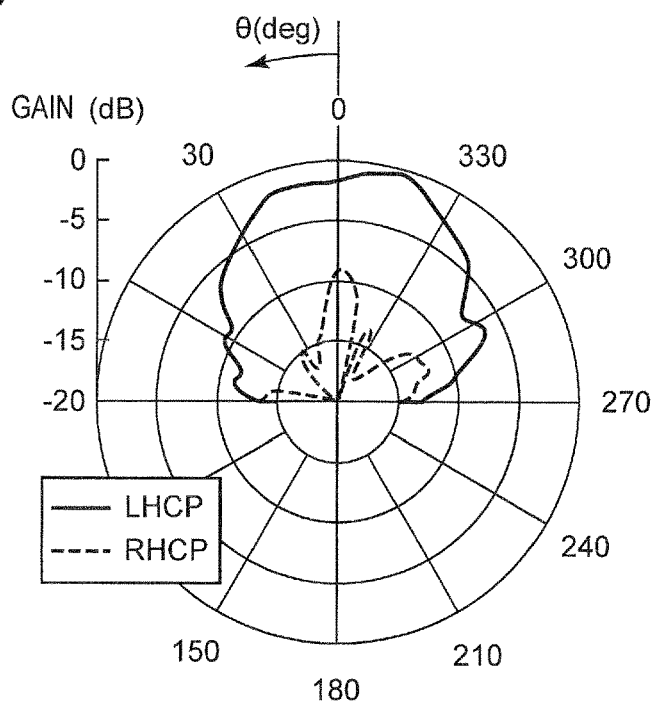
FIG. 25D is a radiation pattern diagram showing an eighth example of the radiation characteristic of the circularly polarized wave antenna apparatus of FIG. 17A.

FIGS. 25A, 25B, 25C, and 25D are radiation pattern diagrams showing fifth to eighth examples of the radiation characteristic of the circularly polarized wave antenna apparatus of FIG. 17A, respectively. In this case, FIGS. 25A and 25B show the cases of externally applied magnetic field $\mu_0 Hext=95$ mT. FIGS. 25C and 25D show the cases of externally applied magnetic field $\mu_0 Hext=-95$ mT. FIGS. 25A and 25C show radiation patterns of the xz plane. FIGS. 25B and 25D show radiation patterns of the yz plane. It can be seen from FIGS. 25A and 25B that a right circularly polarized radiation beam is formed in the broadside direction in the case of a positive externally applied magnetic field. It can be seen from FIGS. 25C and 25D that a left circularly polarized wave radiation beam is formed in the broadside direction in the case of a negative externally applied magnetic field. Thus, it can be seen that the rotation direction of a circularly polarized wave of a radiation beam from an antenna is switched over by switching over (表現が重複) the direction of the externally applied magnetic field.

7. L-Shaped Circularly Polarized Wave Antenna Apparatus

Figure 26A:
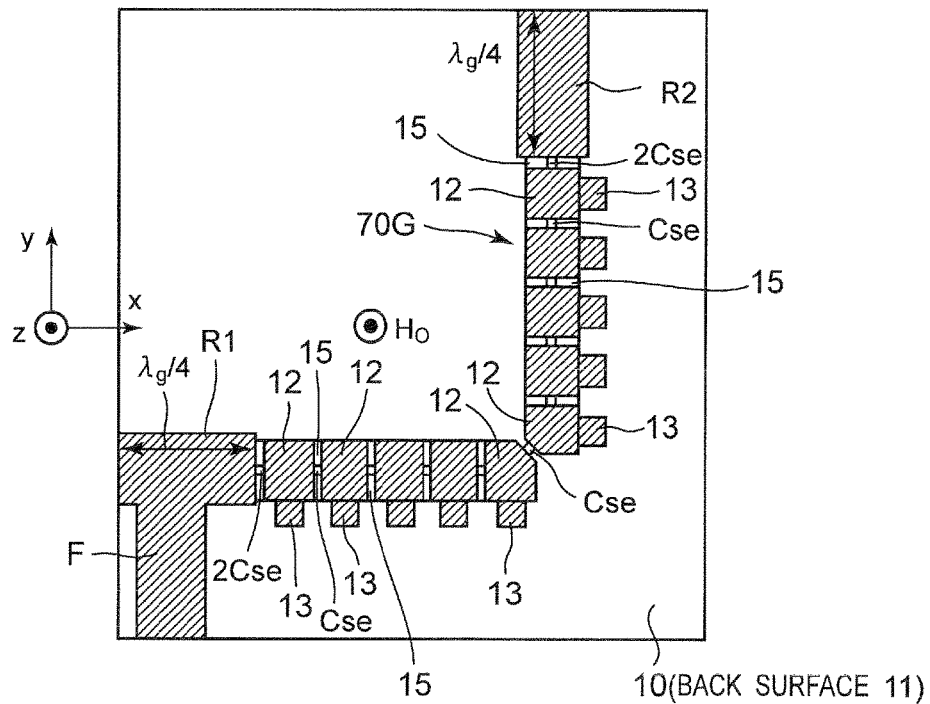
FIG. 26A is a plan view showing a configuration of a circularly polarized wave antenna apparatus using an L-shaped non-reciprocal transmission line apparatus 70G according to an embodiment of the present invention.
Figure 26B:
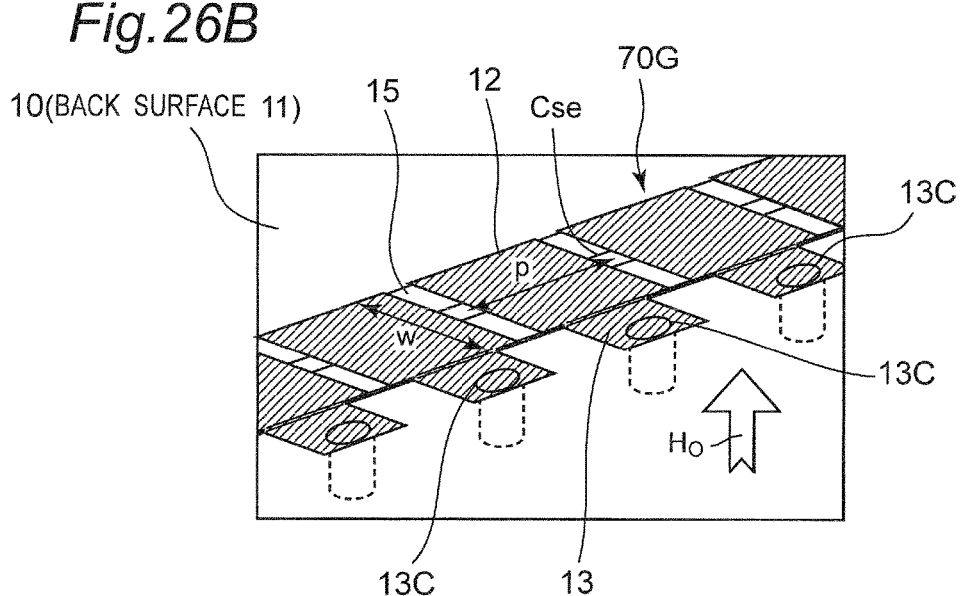
FIG. 26B is an enlarged perspective view showing a partial configuration of FIG. 26A.

FIG. 26A is a plan view showing a configuration of a circularly polarized wave antenna apparatus using an L-shaped non-reciprocal transmission line apparatus 70G according to an embodiment of the present invention. In addition, FIG. 26B is an enlarged perspective view showing a partial configuration of FIG. 26A.

In FIG. 26A, in the circularly polarized wave antenna apparatus, the non-reciprocal transmission line apparatus 70G, which is a non-reciprocal composite right/left-handed line with a finite length, is bent at 90 degrees in the vicinity of the center, and microstrip lines with a length of ¼ wavelength serving as reflectors R1 and R2 for short-circuit are connected to both ends of the non-reciprocal transmission line apparatus 70G. Further, a feed line F is directly connected to a section of the reflector R1 where impedance matching can be made. Structure parameters used for design will be described below. There are two ferrite rods (not shown) buried under the non-reciprocal transmission line apparatus 70G, which is a composite right/left-handed line. The dimension of each rod is 3 mm×0.8 mm×15 mm. Relative dielectric constant $\varepsilon_f$ of ferrite is 15 and relative dielectric constant $\varepsilon_d$ of a dielectric is 2.6. Strip width w of the microstrip line configuring the non-reciprocal transmission line apparatus 70G at the center is 3.0 mm, and size p of a unit cell is 3.0 mm. The width and length of each of the stub conductors 13 periodically inserted are 0.67 mm and 1.6 mm, respectively. As the capacitance of each of the chip capacitors Cse periodically inserted in a series branch, Cse=0.6 pF is assumed. Note that the thickness of a dielectric substrate 10 is 0.8 mm. The number of unit cells constituting an L-type resonator is 10.

Figure 27:
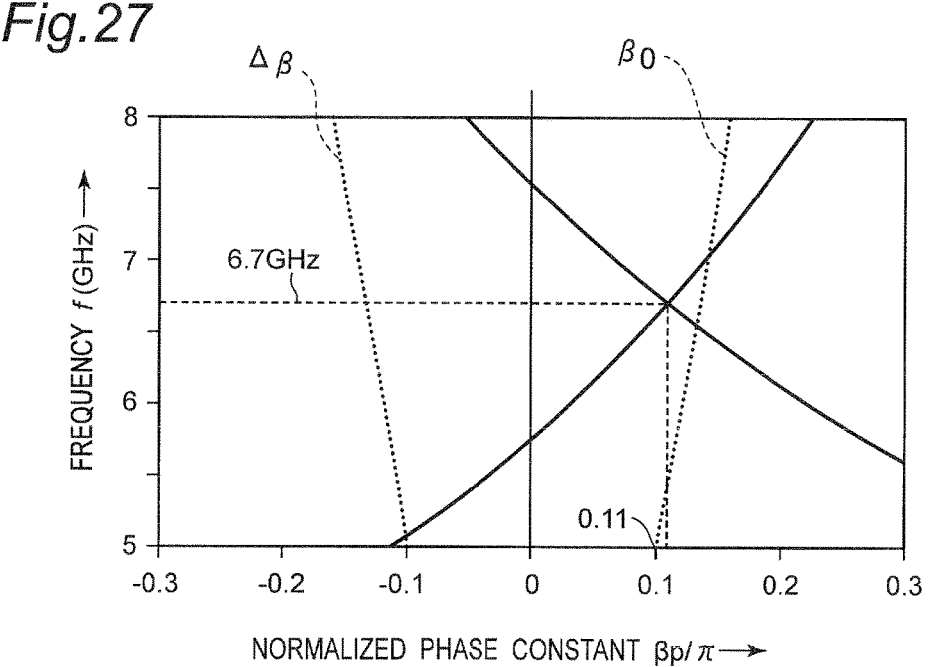
FIG. 27 is a graph showing a propagation characteristic of the non-reciprocal transmission line apparatus 70G of FIG. 26A.

FIG. 27 is a graph showing the propagation characteristic of the non-reciprocal transmission line apparatus 70G of FIG. 26A. In this case, FIG. 27 shows the propagation characteristic of the composite right/left-handed line, which is the non-reciprocal transmission line apparatus 70G configuring the circularly polarized wave antenna apparatus in the case where effective magnetization $\mu_0 Ms$ inside the ferrite is 160 mT. FIG. 27 clearly shows that, since pseudo-travelling wave resonance occurs in the vicinity of the intersection of the two dispersion curves, the operating frequency of the antenna is around 6.7 GHz.

Figure 28:
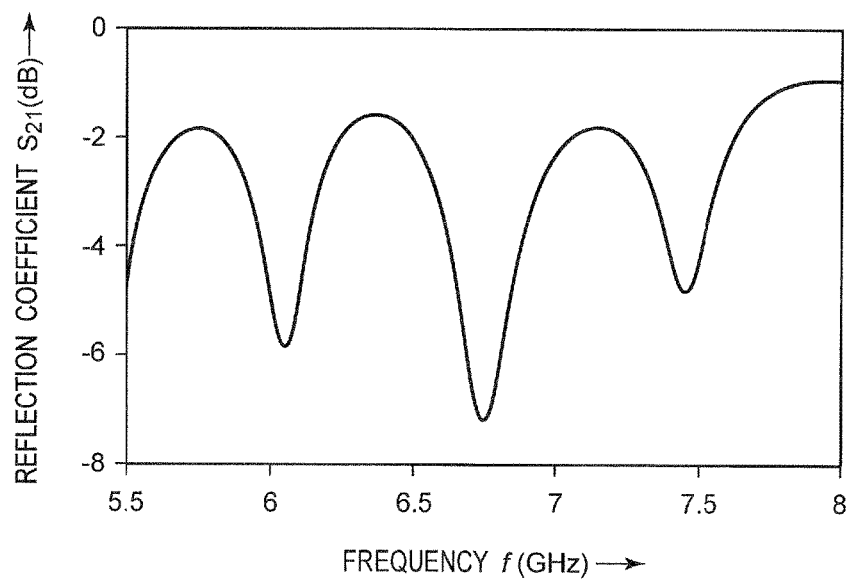
FIG. 28 is a graph showing a reflection characteristic of the circularly polarized wave antenna apparatus of FIG. 26A.

FIG. 28 is a graph showing the reflection characteristic of the circularly polarized wave antenna apparatus of FIG. 26A. In this case, FIG. 28 shows the reflection characteristic of the circularly polarized wave antenna apparatus seen from the feed line F in the case where the number of unit cells is 10. At that time, in a composite right/left-handed line part of the non-reciprocal transmission line apparatus 70G, when the phase difference between a middle point of the line part parallel to the y axis and a middle point of the line part parallel to the z axis is 90 degrees, that is, the phase difference between both ends of the L-shaped bent line is 180 degrees, a radiated wave from the resonator becomes a circularly polarized wave. In FIG. 28, a plurality of notches corresponds to a resonance state. In particular, it is confirmed from the numerical calculation results of the electromagnetic field distribution that resonance at a frequency of 6.7 GHz corresponds to pseudo-travelling wave resonance.

Figure 29A:
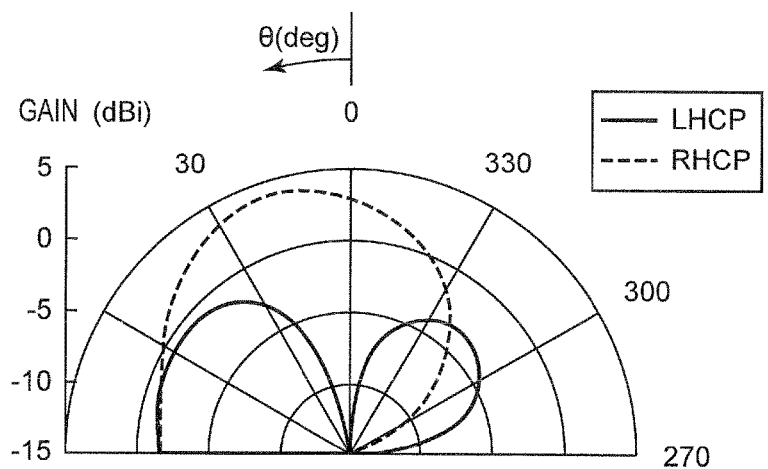
FIG. 29A is a radiation pattern diagram showing a first example of a radiation characteristic of the circularly polarized wave antenna apparatus of FIG. 26A.
Figure 29B:
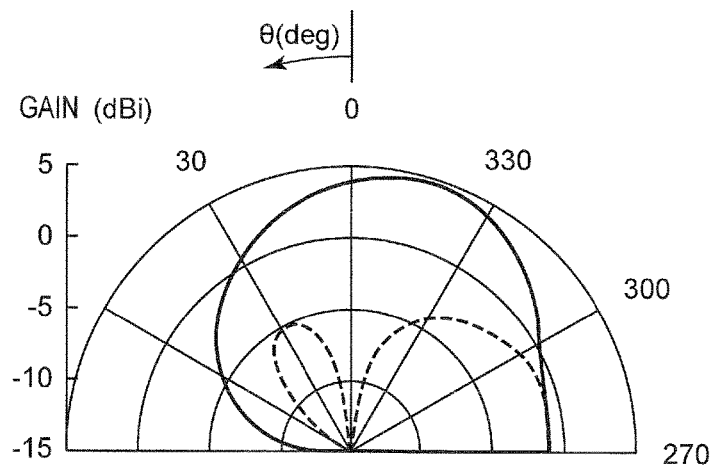
FIG. 29B is a radiation pattern diagram showing a second example of the radiation characteristic of the circularly polarized wave antenna apparatus of FIG. 26A.

FIGS. 29A and 29B are radiation pattern diagrams showing first and second examples of the radiation characteristic of the circularly polarized wave antenna apparatus of FIG. 26A. FIGS. 29A and 29B show radiation patterns from the circularly polarized wave antenna apparatus at the frequency of 6.7 GHz. FIG. 29A shows the case of effective magnetization $\mu_0 Ms=160$ mT, and it can be seen that aright circularly polarized wave is radiated in the broadside direction. FIG. 29B shows the case where the magnetization direction is reversed from the direction in FIG. 29A, effective magnetization $\mu_0 Ms=-160$ mT, and a left circularly polarized wave is dominant. Therefore, it can be seen that by reversing effective magnetization, a radiation beam in the broadside direction is switched over from a right circularly polarized wave to aleft circularly polarized wave.

Figure 30:
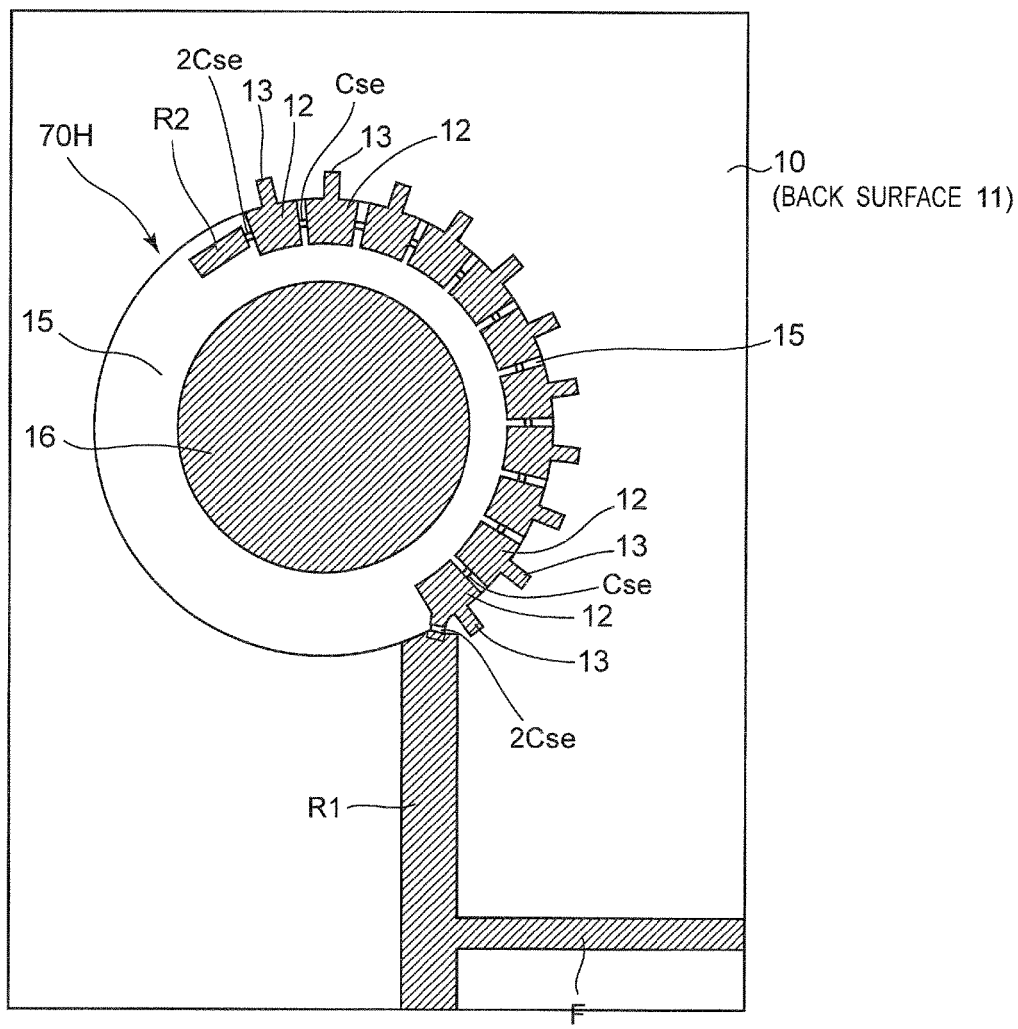
FIG. 30 is a plan view showing a configuration of a circularly polarized wave antenna apparatus using a non-reciprocal transmission line apparatus 70H according to an embodiment of the present invention.

8. Configuration Examples of Various Circularly Polarized Wave Antenna Apparatuses FIG. 30 is a plan view showing a configuration of a circularly polarized wave antenna apparatus using a non-reciprocal transmission line apparatus 70H according to an embodiment of the present invention. Note that in FIGS. 30 to 36, like components as those of the above embodiments are denoted by the same reference characters. FIG. 30 shows a pseudo-travelling wave resonator in a case of configuring a semicircular non-reciprocal transmission line apparatus 70H on a circular ferrite substrate 15. Since circularly polarized radiation is achieved when the phase difference between two current components orthogonal to each other at a non-reciprocal transmission line apparatus part is 90 degrees, circularly polarized radiation is possible even with a semicircular non-reciprocal transmission line apparatus as illustrated in FIG. 30.

Figure 31:
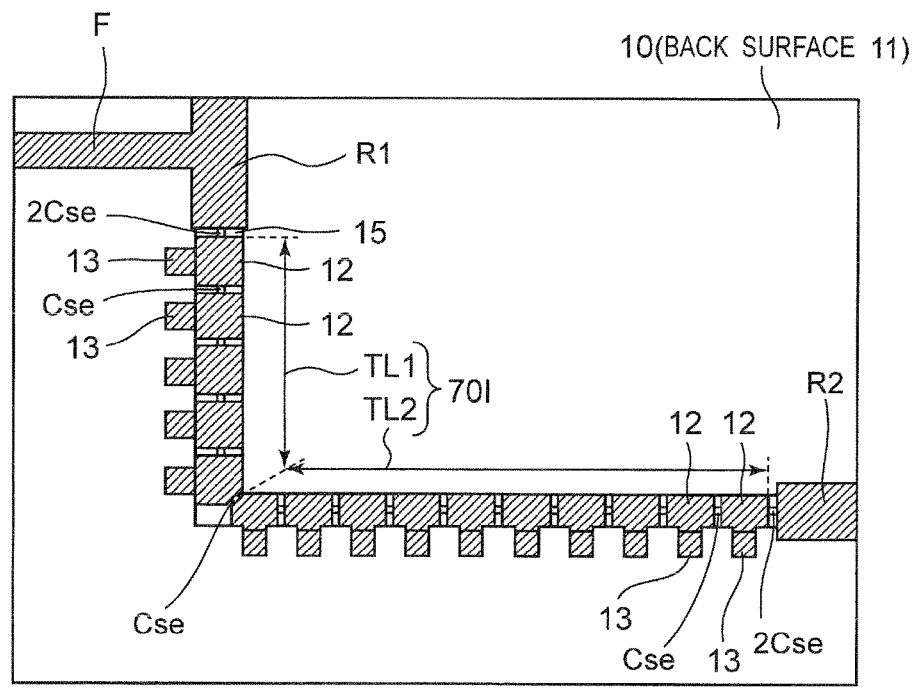
FIG. 31 is a plan view showing a configuration of a circularly polarized wave antenna apparatus using a non-reciprocal transmission line apparatus 70I according to an embodiment of the present invention.

FIG. 31 is a plan view showing a configuration of a circularly polarized wave antenna apparatus using a non-reciprocal transmission line apparatus 70I according to an embodiment of the present invention. FIG. 31 shows a circularly polarized wave antenna apparatus configured by connecting two transmission lines TL1 and TL2 with different propagation characteristics and different lengths to form an L-shape. According to difference in radiated power from the two types of lines TL1 and TL2, the ratio of the lengths of the orthogonal transmission lines TL1 and TL2 is determined, and phase gradients in the transmission lines TL1 and TL2 are set so that the phase difference between the middle points of the transmission lines TL1 and TL2 becomes 90 degrees.

Figure 32:
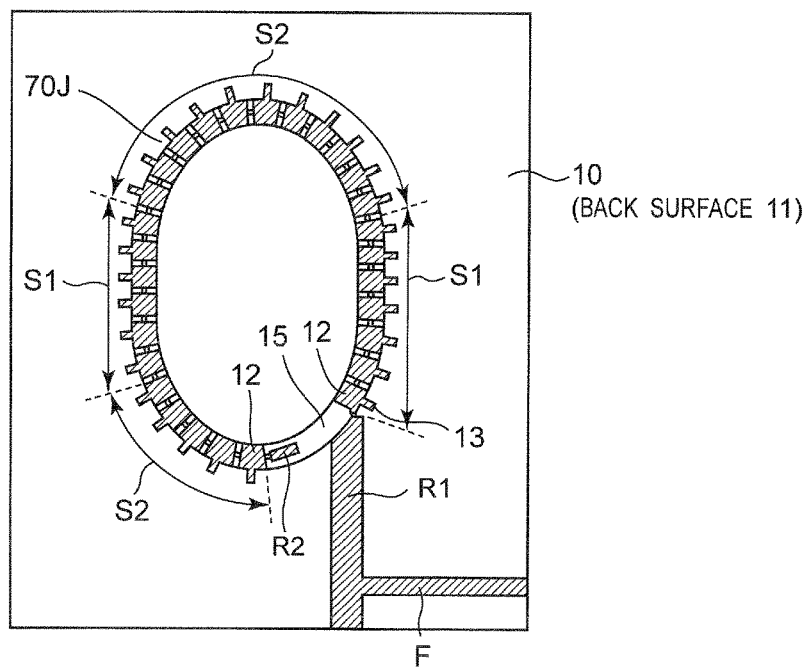
FIG. 32 is a plan view showing a configuration of a circularly polarized wave antenna apparatus using a non-reciprocal transmission line apparatus 70J according to an embodiment of the present invention.

FIG. 32 is a plan view showing a configuration of a circularly polarized wave antenna apparatus using a non-reciprocal transmission line apparatus 70J according to an embodiment of the present invention. In this case, FIG. 32 shows a configuration example of a pseudo-travelling wave resonator in the case of configuring the non-reciprocal transmission line apparatus 70J in an elliptical shape. The non-reciprocal transmission line apparatus 70J is configured by including sections S1 and S1, a pair of linear line parts opposed to each other, and sections 82 and S2, a pair of curved line parts opposed to each other. At that time, structure parameters for unit cells configuring the non-reciprocal transmission line apparatus 70J are not uniform but uneven along the longitudinal direction of the transmission line. However, respective unit cells are designed such that intersections of the dispersion curves are at the almost same frequencies. The ratio of the long axis to the short axis of an ellipse is determined depending on the difference in radiated power from the unit cells distributed unevenly.

Figure 33:
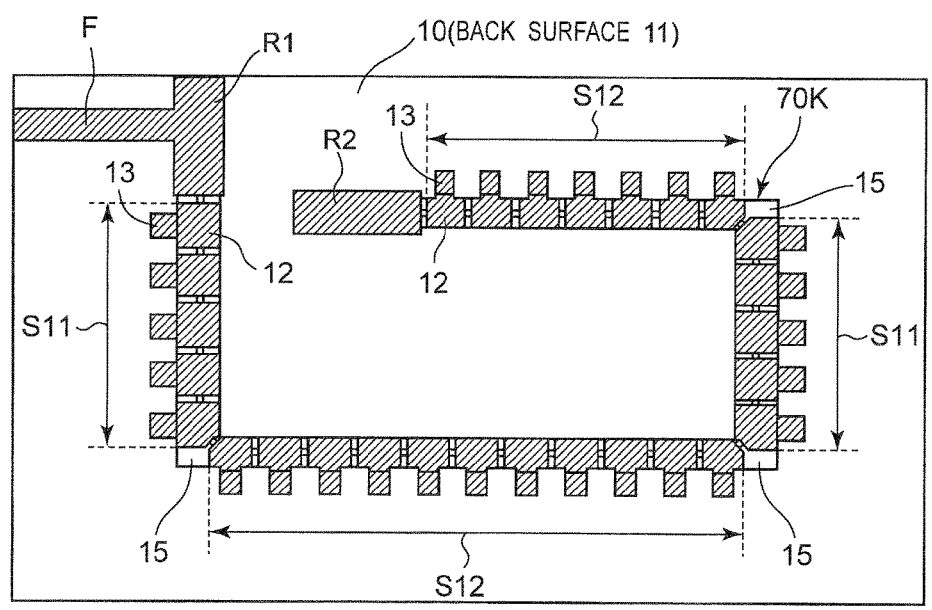
FIG. 33 is a plan view showing a configuration of a circularly polarized wave antenna apparatus using a non-reciprocal transmission line apparatus 70K according to an embodiment of the present invention.

FIG. 33 is a plan view showing a configuration of a circularly polarized wave antenna apparatus using a non-reciprocal transmission line apparatus 70K according to an embodiment of the present invention. In FIG. 33, a circularly polarized wave antenna apparatus constituted of a rectangular pseudo-travelling wave resonator is configured, the apparatus being configured of a structure where the two L-shaped non-reciprocal transmission line apparatuses 70I constituted of the two types of transmission lines TL1 and TL2 shown in FIG. 31 are connected in series.

As shown in FIGS. 31 to 33, by combining non-reciprocal transmission line apparatuses having different propagation characteristics, it is possible to constitute a circularly polarized wave antenna apparatus. The non-reciprocal transmission line apparatus is not necessarily configured to have a perfect circle shape or a square shape.

Figure 34:
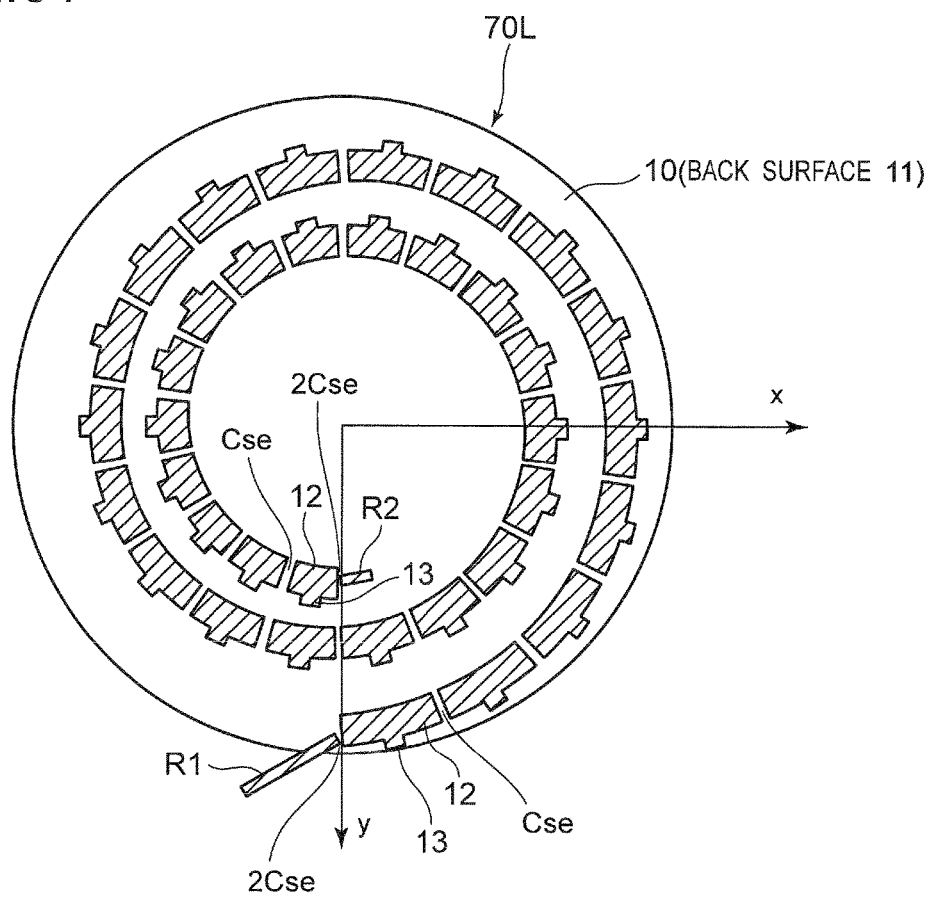
FIG. 34 is a plan view showing a configuration of a circularly polarized wave antenna apparatus using a non-reciprocal transmission line apparatus 70L according to an embodiment of the present invention.

FIG. 34 is a plan view showing a configuration of a circularly polarized wave antenna apparatus using a non-reciprocal transmission line apparatus 70L according to an embodiment of the present invention. FIG. 34 shows a circularly polarized wave antenna apparatus in the case where the non-reciprocal transmission line apparatus 70L is configured in a spiral shape on a circular ferrite substrate 15.

Figure 35:
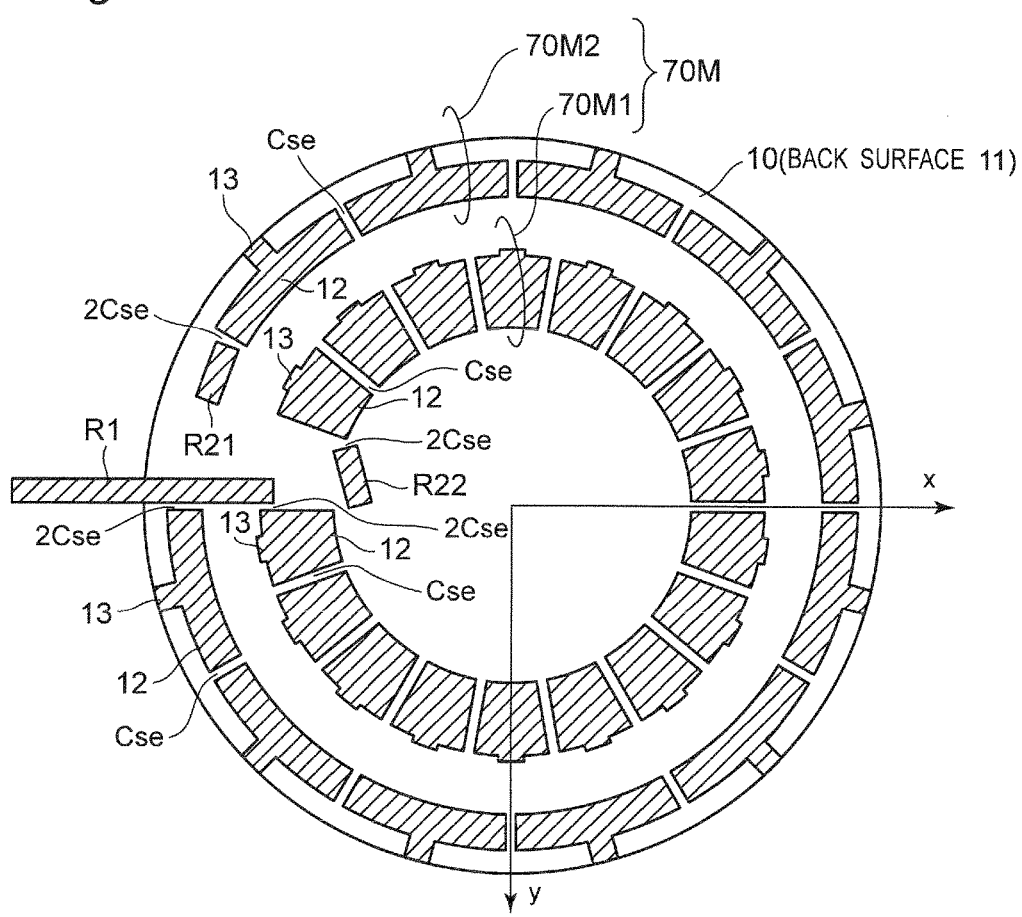
FIG. 35 is a plan view showing a configuration of a circularly polarized wave antenna apparatus using a non-reciprocal transmission line apparatus 70M according to an embodiment of the present invention.

FIG. 35 is a plan view showing a configuration of a circularly polarized wave antenna apparatus using a non-reciprocal transmission line apparatus 70M according to an embodiment of the present invention. FIG. 35 shows a circularly polarized wave antenna apparatus in the case of configuring a pseudo-travelling wave resonator constituted of concentric two types of circular non-reciprocal transmission line apparatuses 70M1 and 70M2 different in propagation characteristics. In FIG. 35, each of the non-reciprocal transmission line apparatus 70M1 positioned inside and having a smaller curvature radius and the non-reciprocal transmission line apparatus 70M2 having a larger curvature radius need to have phase gradients so that the phase difference becomes 360 degrees with respect to wave propagation of one round. Therefore, it is necessary to set the phase constant of the inside non-reciprocal transmission line apparatus 70M1 so as to be greater than the phase constant of the outside non-reciprocal transmission line apparatus 70M2.

Figure 36:
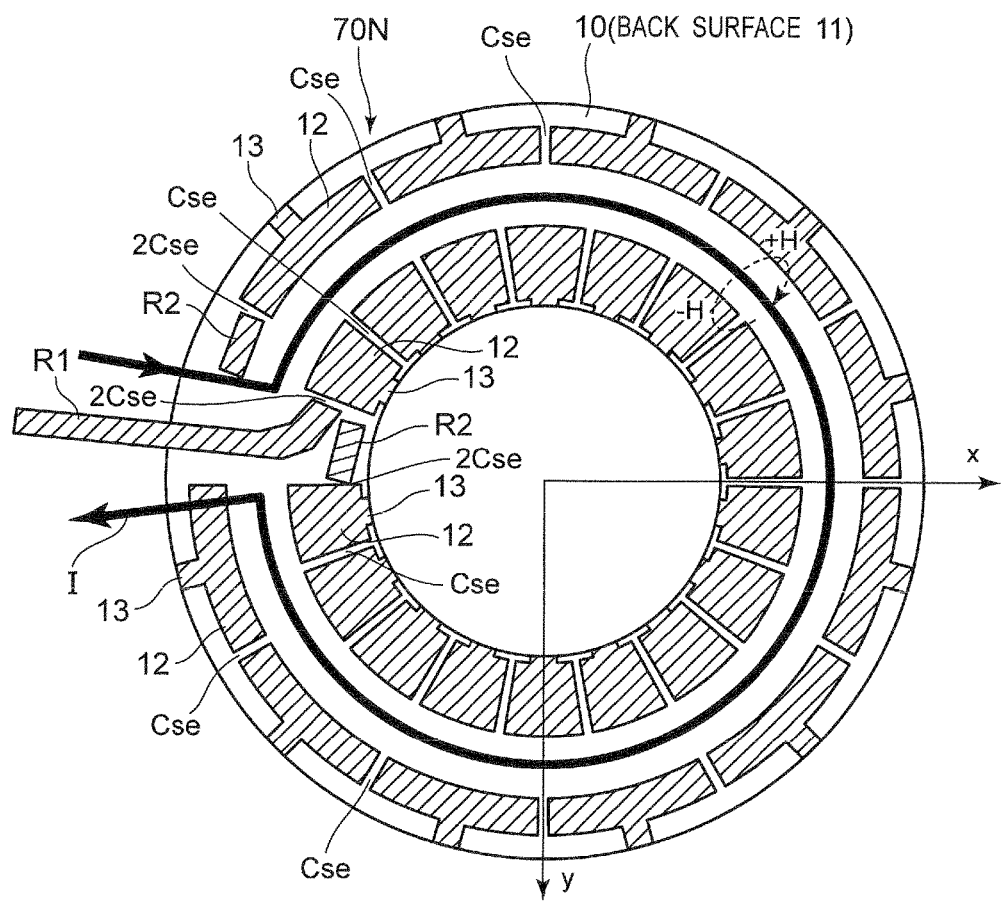
FIG. 36 is a plan view showing a configuration of a circularly polarized wave antenna apparatus using a non-reciprocal transmission line apparatus 70N according to an embodiment of the present invention.

FIG. 36 is a plan view showing a configuration of a circularly polarized wave antenna apparatus using a non-reciprocal transmission line apparatus 70N according to an embodiment of the present invention. In FIG. 36, from among two types of circular non-reciprocal transmission line apparatuses 70N1 and 70N2 configured concentrically, in the non-reciprocal transmission line apparatus 70N2 disposed outside, shunt branch induction stub conductors 13 are periodically inserted to the outside of a circular line as in a conventional manner. In contrast, in the other non-reciprocal transmission line apparatus 70N1 disposed inside, shunt branch induction stub conductors 13 are inserted to the inside of a circular line. As a result, since asymmetry of the structure is reversed, the polarities of non-reciprocity with respect to an externally applied magnetic field turn out to be reversed. Further, a metallic loop for an external DC applied magnetic field is inserted between the two circular non-reciprocal transmission line apparatuses 70N1 and 70N2. It is well known that since current I flowing through the metal loop generates a magnetic field in a clockwise direction, the direction of the magnetic field components vertically intersecting a ferrite substrate 15 on the inside of the metal loop and the direction of those on the outside are reversed. Thus, by combining reversal of asymmetry of the structure due to stub insertion and reversal of the direction of the applied magnetic field, non-reciprocity turns out to appear in the same direction in the two types of circular non-reciprocal transmission line apparatuses 70N1 and 70N2 disposed on the inside and outside of the metal loop. As a result, radiation from the two circular non-reciprocal transmission line apparatuses 70N1 and 70N2 polarization-rotates in the same direction.

In FIG. 36, in a pseudo-travelling wave resonator constituted of the two circular non-reciprocal transmission line apparatuses 70N1 and 70N2 configured concentrically, the side to which the stub conductors 13 are inserted is reversed in the case of the inside circular line and the case of the outside circular line. However, the reverse combination of the sides to which the stub conductors 13 are inserted may be adopted. That is, a structure may be adopted where the stub conductors 13 are inserted to the outside of the circular line in the inside circular non-reciprocal transmission line apparatus 70N1, and the stub conductor 13 is inserted to the inside of the circular line in the outside circular non-reciprocal transmission line apparatus 70N2.

9. Setting Conditions for Reflector in Circularly Polarized Wave Antenna Apparatus FIG. 37 is a table showing simulation results when reflector length L_Refl changes in a ring-shaped circularly polarized wave antenna apparatus using the non-reciprocal transmission line apparatus 70F of FIG. 17A. That is, FIG. 37 shows the central frequency, the antenna radiation gain, the axial ratio, and the radiation efficiency of pseudo-travelling wave resonance in the case of changing a characteristic of the reflector R2 to which the feed line F is not inserted from among two reflectors R1 and R2 inserted to both sides of the pseudo-travelling wave resonator. Each of the reflectors R1 and R2 is configured of a one-end open microstrip line with a finite length, and operates as a variable reactive element by changing the length of the line. When the line length is 0, impedance is infinite (admittance is 0). When the line length is sufficiently shorter than the wavelength, the reflector operates as a capacitive element. When the line length is ¼ (within the line) wavelength, the reflector operates as a short-circuited element having nearly 0 impedance. When the line length is longer than ¼ wavelength but shorter than ½ wavelength, the reflector operates as an inductive element.

Due to the dispersion relation of the non-reciprocal transmission line apparatus 70F, the operating frequency is 4.95 GHz, and at that time, the length of ¼ (within the line) wavelength λg is 4.5 mm. It can be seen from the table of FIG. 37 that the operating frequency of the circularly polarized wave antenna apparatus is 5.14 GHz in the case where a reflector constituted of the microstrip line with this length is inserted as R2. According to FIG. 37, it can be seen that the shorter the length of the microstrip line constituting the reflector R2, the higher the operating frequency. That is, the result is that if the reactance of the reflector R2, one of the reflectors, is a negative value, as the absolute value thereof becomes greater, the resonance frequency shifts to a higher frequency side. To begin with, an exemplary possible cause of this is the problem of manufacturing accuracy of the non-reciprocal transmission line apparatus 70F. In dispersion curves of the prototyped non-reciprocal transmission line apparatus 70F within the resonator, design is attempted so as to eliminate a band gap. However, in reality, a band gap exists, and it is considered that an operating point moves within the band gap due to a change in reflection conditions on both ends of the resonator. The bandwidth of the band gap is a frequency domain sandwiched by two resonance frequencies of series resonance in a series branch in the case of both-ends short circuit and parallel resonance in shunt branch in the case of both-ends open. It is considered that the operating frequency increases along with an increase in reactance of a reflective element because the parallel resonance frequency of the shunt branch is higher than the series resonance frequency of the series branch due to both-ends short circuit in the non-reciprocal transmission line apparatus 70F prototyped this time. Another possible cause of the resonance frequency shifting to the high frequency side is great deviation from zeroth-order resonance conditions due to changes in the structure parameters of only one of the reflectors. Thus, in either case, the operating frequency of the resonator fluctuates along with fluctuation of the characteristic of the reflector R2, and the manner of fluctuation greatly differs depending on the manufacturing accuracy of the composite right/left-handed line configuring the resonator. Note that in the circularly polarized wave antenna apparatus prototyped this time, the axial ratio is lowest, and moreover, the radiation efficiency is greatest in the case of the reflector length of 4.5 mm, that is, the case closest to both-ends short circuit.

FIG. 38 is a table showing simulation results when reflector length L_Refl changes in the circularly polarized wave antenna apparatus using the L-shaped non-reciprocal transmission line apparatus 70I of FIG. 31. That is, FIG. 38 shows the central frequency, the antenna radiation gain, the axial ratio, and the radiation efficiency of pseudo-travelling wave resonance in the case of changing the characteristic of the reflector R2 to which the feed line F is not inserted from among the two reflectors R1 and R2 inserted to both sides of the pseudo-travelling wave resonator. Each of the reflectors R1 and R2 is configured of a one-end open microstrip line with a finite length, and operates as a variable reactive element by changing the length of the line. When the line length is 0, impedance is infinite (admittance is 0). When the line length is sufficiently short with respect to the wavelength, the reflector operates as a capacitive element. When the line length is ¼ (within the line) wavelength, the reflector operates as a short-circuited element having nearly 0 impedance. When the line length is longer than ¼ wavelength but shorter than ½ wavelength, the reflector operates as an inductive element.

Due to the dispersion relation of the non-reciprocal transmission line apparatus 70I, the operating frequency is 5.8 GHz, and at that time, the length of ¼ (within the line) wavelength λg is 8.5 mm. It can be seen from the table of FIG. 38 that the operating frequency of the circularly polarized wave antenna apparatus is 6.02 GHz in the case where the reflectors R1 and R2 each constituted of the microstrip line with this length are inserted. According to FIG. 38, it can be seen that the shorter the length of the microstrip line configuring the reflector R2, the higher the operating frequency. That is, the result is that if the reactance of the reflector R2, one of the reflectors, is a negative value, as the absolute value thereof becomes greater, the resonance frequency shifts to a higher frequency side. To begin with, an exemplary possible cause of this is the problem of manufacturing accuracy of the non-reciprocal transmission line apparatus 70F. In dispersion curves of the prototyped non-reciprocal transmission line apparatus 70F within the resonator, design is attempted so as to eliminate a band gap. However, in reality, a band gap exists, and it is considered that an operating point moves within the band gap due to a change in reflection conditions on both sides of the resonator. The bandwidth of the band gap is a frequency domain sandwiched by two resonance frequencies of series resonance in a series branch in the case of both-ends short circuit and the parallel resonance in a shunt branch in the case of both-ends open. It is considered that the operating frequency increases along with an increase in reactance of a reflective element since the parallel resonance frequency of the shunt branch is higher than the series resonance frequency of the series branch due to both-ends short circuit in the non-reciprocal transmission line apparatus 70I prototyped this time. Another possible cause of the resonance frequency shifting to the high frequency side is great deviation from zeroth-order resonance conditions due to changes in the structure parameters of only one of the reflectors. Thus, in either case, the operating frequency of the resonator fluctuates along with fluctuation of the characteristics of the reflectors R1 and R2, and the manner of fluctuation greatly differs depending on the manufacturing accuracy of the composite right/left-handed line constituting the resonator.

Note that in the circularly polarized wave antenna apparatus prototyped this time, the radiation efficiency is highest in the case of the reflector length of 8.5 mm, that is, the case closest to both-ends short circuit. Around that length, the gain is highest in the case of the reflector length of 7.5 mm, and the axial ratio is lowest in the case of the reflector length of 9.5 mm.

10. Summary of Embodiment

As described above, according to the present embodiment, the operating frequency of the pseudo-travelling wave resonator configured of one of the non-reciprocal transmission line apparatuses 70E to 70N can be estimated from the dispersion characteristic of the one of the non-reciprocal transmission line apparatus 70E to 70N configuring the resonator. Therefore, the resonance characteristic of the design structure was investigated focusing on the estimated frequency. As a result, a resonance state showing a desired electromagnetic field distribution was obtained in the vicinity of the estimated frequency. FIG. 16A shows the magnetic field vector distribution obtained by numerical calculation at that time. It was confirmed that radiations from one of the non-reciprocal transmission line apparatuses 70E to 70N strengthen each other in a single direction without offsetting each other, and as a result, the radiation exhibits circular polarization characteristics.

The circularly polarized wave antenna apparatus of a pseudo-circulating wave according to the present embodiment can greatly widen the application field of a circularly polarized wave antenna since the antenna apparatus can be made compact and lightweight, and the direction of polarization rotation which can be dynamically switched over is not limited to a predetermined direction. For example, the concept of the antenna apparatus can be utilized for a mobile use providing high reliability of a communication link and having rapidly changing environmental conditions. Similarly, the concept has the applicability of switching over a LHCP beam and a RHCP beam according to request, and also has applicability to an application of a radar capable of facilitating detection of an object having a small radar cross-section or an abnormal electromagnetic surface coating, or an object in a complicated environment.

According to the present invention, it is possible to provide a non-reciprocal transmission line apparatus for a circularly polarized wave antenna apparatus capable of radiating a circularly polarized electromagnetic wave, and a circularly polarized wave antenna apparatus more compact in size and more lightweight than that of the prior art.

DESCRIPTION OF REFERENCE NUMERALS

10: DIELECTRIC SUBSTRATE
11: GROUND CONDUCTOR
12: STRIP CONDUCTOR
13: STUB CONDUCTOR
13C: VIA CONDUCTOR
15: FERRITE PLATE
60A to 60D: UNIT CELL
61, 62: TRANSMISSION LINE PART
70A to 70N, 70M 1, 70M2, 70N1, and 70N2: NON-RECIPROCAL TRANSMISSION LINE APPARATUS
80: EXTERNAL MAGNETIC FIELD GENERATOR
C, C1, C2, C60, and Cse: CAPACITOR
F: FEED LINE
L, L1 to L6: INDUCTANCE
P1, P2, P11, and P12: PORT
R1, R2: REFLECTOR
S1 to S12: SECTION
TL1, TL2: TRANSMISSION LINE

The invention claimed is:

1. A circularly polarized wave antenna apparatus comprising a non-reciprocal transmission line apparatus having forward and backward propagation constants different from each other, the non-reciprocal transmission line apparatus including a transmission line part for a microwave, a series branch circuit equivalently including a capacitive element, and a shunt branch circuit branched from the transmission line part and equivalently including an inductive element, wherein the non-reciprocal transmission line apparatus is formed in a nonlinear shape and magnetized in a magnetization direction different from a propagation direction of the microwave, wherein the non-reciprocal transmission line apparatus comprises first and second reflectors connected to both ends of the non-reciprocal transmission line apparatus, respectively, and the first and second reflectors reflect a signal, wherein the non-reciprocal transmission line apparatus satisfies at least one of the following:

(A) a phase difference between each pair of line parts located at positions opposed to each other across a substantially central part of the non-reciprocal transmission line apparatus is substantially 180 degrees;

(B) a phase difference between each pair of line parts located at positions adjacent to each other on an identical side with respect to the substantially central part of the non-reciprocal transmission line apparatus from is substantially 0 degrees; and (C) a phase difference between at least one pair of line parts located at positions substantially orthogonal to each other of the non-reciprocal transmission line apparatus is substantially 90 degrees, and wherein the circularly polarized wave antenna apparatus radiates an electromagnetic wave of right-hand circular polarization or left-hand circular polarization.

2. The circularly polarized wave antenna apparatus as claimed in claim 1, wherein the non-reciprocal transmission line apparatus configures a pseudo-travelling wave resonator, and wherein the pseudo-travelling wave resonator includes:

a first line part causing a current to flow in a predetermined first direction and radiating an electromagnetic wave polarized in the first direction, and a second line part causing a current to flow in a second direction, which is a vertical direction substantially orthogonal to the current flowing through the first line part, and radiating an electromagnetic wave which is polarized in the second direction, and moreover, a phase of which is advanced or delayed by 90 degrees from a phase of the electromagnetic wave of the first line part.

3. The circularly polarized wave antenna apparatus as claimed in claim 1, wherein the non-reciprocal transmission line apparatus is disposed in a single-turn ring shape having a circular, elliptical, square or rectangular shape, a spiral shape with a plurality of turns, or an L-shape.

4. The circularly polarized wave antenna apparatus as claimed in claim 1, wherein the circularly polarized wave antenna apparatus radiates an electromagnetic wave of right-hand circular polarization or left-hand circular polarization by switching over the magnetization direction to opposite directions.

5. The circularly polarized wave antenna apparatus as claimed in claim 1,
   wherein a phase gradient is adjusted by changing at least one of:
   (a) a number of circuits including the transmission line part, the series branch circuit, and the shunt branch circuit;
   (b) magnitude of the magnetization; and
   (c) an electrical length of the shunt branch circuit.

6. The circularly polarized wave antenna apparatus as claimed in claim 1,
   wherein the first and second reflectors satisfy one of the following setting conditions:
   (1) a first setting condition where an impedance thereof is 0, or the impedance has a value equal to or smaller than a predetermined value;
   (2) a second setting condition where an admittance thereof is 0, or the admittance has a value equal to or smaller than a predetermined value; and
   (3) a third setting condition that the first and the second reflectors have reactance elements in a complex conjugate relation.

\* \* \* \* \*